(12) United States Patent
Shuster et al.

(10) Patent No.: US 7,752,251 B1
(45) Date of Patent: Jul. 6, 2010

(54) METHOD, APPARATUS AND SYSTEM FOR HOSTING INFORMATION EXCHANGE GROUPS ON A WIDE AREA NETWORK

(76) Inventors: Brian Mark Shuster, P.O. Box 2153, Stateline, NV (US) 89449; Gary Stephen Shuster, 2067 Manzanita Dr., Oakland, CA (US) 94611

( * ) Notice: Subject to any disclaimer, the term of this patent is extended or adjusted under 35 U.S.C. 154(b) by 1621 days.

(21) Appl. No.: 09/648,474

(22) Filed: Aug. 21, 2000

Related U.S. Application Data

(63) Continuation-in-part of application No. 09/548,804, filed on Apr. 14, 2000, now abandoned.

(51) Int. Cl.
G06F 15/16 (2006.01)

(52) U.S. Cl. ...................... 709/200; 715/700

(58) Field of Classification Search .................. 705/12, 705/10; 707/12, 5, 10, 1; 709/206, 204, 709/228, 224, 229, 201, 205; 463/25; 702/179; 345/763, 706; 715/733, 751, 234
See application file for complete search history.

(56) References Cited

U.S. PATENT DOCUMENTS

| | | | | |
|---|---|---|---|---|
| 5,423,038 | A | * | 6/1995 | Davis ........................ 705/12 |
| 5,724,567 | A | * | 3/1998 | Rose et al. .................... 707/2 |
| 5,761,662 | A | | 6/1998 | Dasan |
| 5,790,426 | A | * | 8/1998 | Robinson ................... 702/179 |
| 5,799,151 | A | * | 8/1998 | Hoffer ....................... 709/204 |
| 5,960,411 | A | | 9/1999 | Hartman et al. |
| 5,974,412 | A | | 10/1999 | Hazlehurst et al. |
| 5,995,943 | A | | 11/1999 | Bull et al. |
| 6,029,141 | A | | 2/2000 | Bezos et al. |
| 6,041,308 | A | | 3/2000 | Walker et al. |
| 6,064,980 | A | | 5/2000 | Jacobi et al. |
| 6,078,916 | A | * | 6/2000 | Culliss ........................ 707/5 |
| 6,101,532 | A | * | 8/2000 | Horibe et al. ............... 709/206 |
| 6,112,186 | A | * | 8/2000 | Bergh et al. .................. 705/10 |
| 6,240,412 | B1 | * | 5/2001 | Dyko et al. .................... 707/5 |
| 6,260,064 | B1 | * | 7/2001 | Kurzrok ..................... 709/224 |
| 6,275,811 | B1 | * | 8/2001 | Ginn .......................... 705/10 |
| 6,288,717 | B1 | * | 9/2001 | Dunkle ....................... 345/763 |
| 6,343,990 | B1 | * | 2/2002 | Rasmussen et al. .......... 463/25 |
| 6,460,036 | B1 | * | 10/2002 | Herz .......................... 707/10 |
| 6,484,196 | B1 | * | 11/2002 | Maurille .................... 709/206 |
| 6,515,681 | B1 | * | 2/2003 | Knight ....................... 715/751 |
| 6,519,629 | B2 | * | 2/2003 | Harvey et al. ............... 709/204 |
| 6,826,618 | B2 | * | 11/2004 | Morris et al. ............... 709/229 |
| 6,889,247 | B2 | * | 5/2005 | Christie et al. .............. 709/205 |
| 7,257,767 | B1 | * | 8/2007 | Carden, Jr. .................. 715/234 |

(Continued)

Primary Examiner—Dustin Nguyen
(74) Attorney, Agent, or Firm—Knobbe Martens Olson & Bear, LLP

(57) ABSTRACT

An method and system for hosting information exchange groups on a wide area network is disclosed, using various tools for promoting topical organization and self-evolution of the information exchange groups, and of a system of information exchange groups. These tools include methods for providing user rating of posts within the exchange group, for rating and ranking users of the exchange group, for rating and ranking links to related information pages and especially to related exchange groups operating according to the methods of the invention, and for continuously updating rating and ranking information. Additionally, methods are provided for users to found exchange groups, to filter information in exchange groups according to specified user preferences, and to protect private information from inadvertent disclosure to other users of the exchange group.

42 Claims, 22 Drawing Sheets

U.S. PATENT DOCUMENTS

| | | | |
|---|---|---|---|
| 2002/0005865 A1* | 1/2002 | Hayes-Roth | 345/706 |
| 2002/0049738 A1* | 4/2002 | Epstein | 707/1 |
| 2002/0087616 A1* | 7/2002 | Garsoe | 709/201 |
| 2002/0133494 A1* | 9/2002 | Goedken | 707/10 |
| 2006/0149833 A1* | 7/2006 | Dan et al. | 709/218 |
| 2006/0242583 A1* | 10/2006 | MacNaughton et al. | 715/733 |

* cited by examiner

| | NO. OF POSTS | AVG. POST LENGTH | AVG. FLAMES | AVG. SPAM | AVG. RELEVANCE | AVG. ACCURACY | VOTES RECEIVED | POSTS VIEWS | WEB PAGES | CLASSIFICATION | |
|---|---|---|---|---|---|---|---|---|---|---|---|
| USER 1 | 20 | 123 | 3.2 | 0 | 7.5 | 5.5 | 100 | 560 | 0 | ACTIVE MEMBER | ........ |
| USER 2 | 3 | 605 | 0 | 0 | 9.5 | 9.2 | 80 | 240 | 50 | EXPERT | ........ |
| USER 3 | 50 | 350 | 0 | 50 | 0 | 0 | 75 | 150 | 0 | SPAMMER | ........ |
| USER 4 | 0 | 0 | 0 | 0 | 0 | 0 | 0 | 300 | 0 | LURKER | ........ |

| | 1141 PAGE TRAFFIC | 1142 VOTES RECEIVED | 1143 RELEVANCE | 1144 ACCURACY | 1145/1124 EASE OF USE | 1146 RESPONSIVENESS | 1147 FUN RATING | 1148 CLASSIFICATION | 1149 RANK IN CLASS | 1150 ASSOC. USER | |
|---|---|---|---|---|---|---|---|---|---|---|---|
| PAGE 1 | 1000 | 100 | 9.6 | 9.4 | 9.0 | 9.5 | 1.0 | EXPERT | 1 | 33 | ........ |
| PAGE 2 | 2000 | 200 | 8.9 | N/A | 9.3 | 9.1 | 9.2 | FUN | 1 | 502 | ........ |

| | RELATEDNESS RANK | USE FREQ. | # OF MEMBERS | RELIANCE | DEPTH OF SCOPE | BREADTH OF SCOPE | # OF POSTINGS | CLASSIFICATION | CLASS RANK | |
|---|---|---|---|---|---|---|---|---|---|---|
| WEBROOM 1 | 9 | 100 | 30,000 | 9.5 | 9.4 | 3.2 | 10,000 | ACA-DEMIC | 5 | ........ |
| WEBROOM 2 | 56 | 200 | 100,000 | 9.0 | 3.5 | 9.0 | 200,000 | KIDS | 10 | ........ |

METHOD, APPARATUS AND SYSTEM FOR HOSTING INFORMATION EXCHANGE GROUPS ON A WIDE AREA NETWORK

RELATED APPLICATION DATA

This application is a continuation-in-part of U.S. patent application Ser. No. 09/548,804, now abandoned, filed Apr. 14, 2000, which application is specifically incorporated herein, in its entirety, by reference.

BACKGROUND OF THE INVENTION

1. Field of the Invention

The present invention relates to methods for exchanging and locating information on computer networks, and more particularly, to a method and system for hosting information exchange groups on a wide area network.

2. Description of Related Art

Wide area networks, such as the Internet, provide a vast and growing source of information to a large and growing number of users on demand. One of the great advantages of exchanging information on a wide area network is that users, and groups of users, may readily exchange information with one another, both contemporaneously and at different times. However, the quantity, dynamics and decentralized nature of information on the Internet and other factors create obstacles to the exchange of information among the users.

Various ways of exchanging information within groups of users, such as information exchange groups are known in the art. For example, Web based bulletin boards, "usenet" news groups, and chat rooms are forms of prior art information exchange groups. Prior art information exchange groups do not realize the benefits and advantages possible in consideration of the Internet, the World Wide Web, Internet browsers, and human behavior. Prior art information exchange groups do not provide a systematic method for discriminating between desired and undesired information. Therefore, prior art information exchange groups contain limited quantities of desired information, which tends to be randomly interspersed within a much larger collection of undesired information having little or no information value.

For example, prior art information exchange groups are intruded upon by advertisements and deluged by inappropriate posts and arguments among posters. Knowledgeable users, i.e., "experts," on a particular topic are frequently unavailable, thereby limiting the amount of useful information that can be obtained. Other problems that exist include, for example, the inability of these groups to be located by end users, the lack of specificity of the topics discussed, or the lack of participation in the group by all but a fraction of wide area network users due to the complexity of locating a group with pertinent discussion topics and the complexity of reading and participating in the posting. Further, the nature of the groups, such as chat rooms, deters user participation for a variety of reasons. For instance, users of prior art groups, such as chat rooms, are subject to a loss of anonymity. If the user desires to be contacted, the user must post his email address. Frequently, users' email addresses are collected for commercial use, and the user is then subjected to unwanted contact from unrelated sources. Additionally, prior art groups do not effectively supplement user communications with related information, such as a list of hyperlinks to relevant sites. In addition, prior art groups do not facilitate the use or direct exchange of audio or visual information. Prior art information exchange groups do not provide users a way to conveniently create or join an information exchange group, for example, a chat room, wherein the user's e-mail address is protected from other users and from unwanted commercial use. Also, prior art groups do not provide for control by the users of the scope of information exchanged within the information exchange group. For the foregoing reasons, information exchange groups are not as widely used as they could be, nor has their full potential been realized.

Therefore, a need exists to provide for the operation of information exchange groups on a wide area network that overcomes the limitations of the prior art.

SUMMARY OF THE INVENTION

The present invention provides a system and method for hosting a new type of information exchange group, herein called a Webroom, on a wide area network, such as the Internet. A Webroom is a species of information exchange group, comprising a computer-implemented, topically organized self-evolving exchange group on a wide area network, according to the present invention. The system and method provides Webrooms with properties and features for harnessing the power of the Internet and a distributed user community to build information exchange groups, and systems of interlinked groups, with superior quantity and quality of information content, and superior organization of information by topic. The method and system provides for user participation and user feedback that rewards the gathering and dissemination of useful and desired topical information within Webrooms, while discouraging and eliminating unwanted or less useful information. The system additionally provides other features for attracting users and encouraging user participation.

Thus, the system and method provides for promotion of Webrooms by a powerful network effect. That is, as information content and number of participating users of a Webroom grows, the Webroom becomes more likely to attract additional users and to contain more useful information. An additional advantage is that the operating cost of hosting a Webroom, after the initial set-up cost, is essentially limited to the system bandwidth and storage needed to accommodate growth in usage, because substantially all of the Webroom content is provided by the subscribing user community.

The system and method make use of various software-implemented processes, or "tools," to achieve the advantages described above. Underlying these tools is a software engine for enabling users to easily create their own topical Webrooms, and to peruse, post and evaluate information within Webrooms. A first tool rewards users, or groups of users, who establish Webrooms (such users being called "founders") by referring traffic from the Webroom Web site to a Web site of the founders' choice. A second tool rewards users who refer other users to the Webroom Web site in the same manner. A third tool ranks and filters information presented on the site based on statistical user evaluation and use data, and user specified preferences. A fourth tool similarly ranks and filters information sources, such as contributing users and related Web Sites or Web Pages. A fifth tool provides users of a Webroom with anonymous messaging, or chat room capability. A sixth tool provides user protection filters, especially useful for protecting child users.

The system and method implements the above tools using a graphical user interface having novel features. For example, the graphical interface presents messages in threaded or unthreaded format, according to the user's selection using a toggle button. Other graphical features include a tolerance bar used for information filtering according to user preferences, and pop-up or pull-down lists of related Web pages or other information sources.

A more complete understanding of Webrooms will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1A:
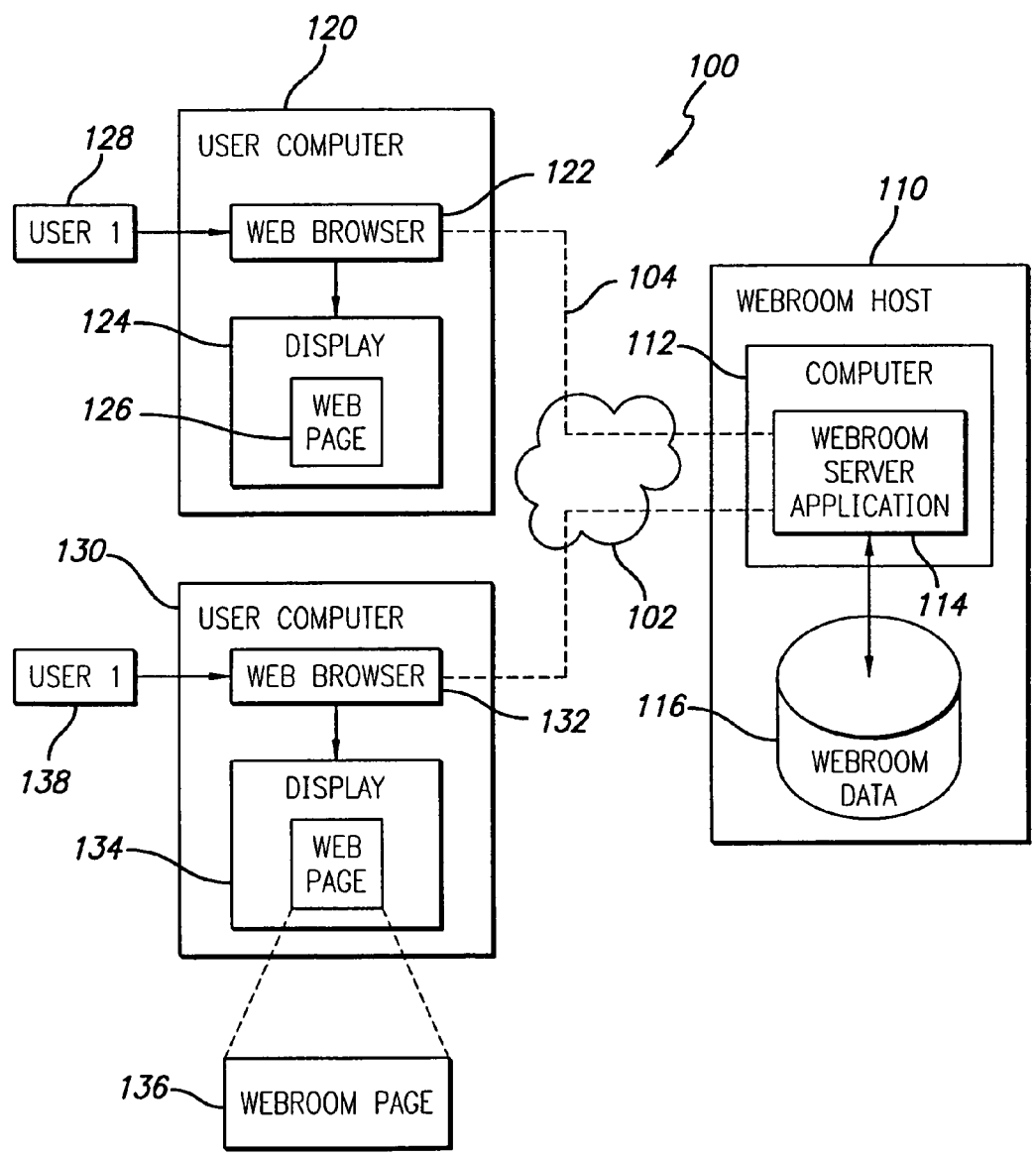
FIG. 1A is a block diagram illustrating a computer system for providing Webrooms according to the present invention.

The present invention satisfies the need for a method and system for providing an information exchange group, that adds new functions and improves upon prior art information exchange groups. In the detailed description that follows, like element numerals are used to describe like elements illustrated in one or more figures. Various terms and acronyms are used throughout the detailed description, including the following:

Application. Within the context of computer hardware and software, an application is a set of one or more computer programs that performs a function when executed within a computer hardware device. If the set is comprised of plural programs, the programs are coordinated to perform a function together; such programs may also perform other functions individually. Similarly, a program may be comprised of plural modules that perform certain functions individually and other functions when combined in various ways.

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user. The program which responds to browser requests by serving Web pages is commonly referred to as a "Web server."

Cookies. A technology that enables a Web server to retrieve information from a user's computer that reveals prior browsing activities of the user. The information item is stored on the user's computer (typically on the hard drive) is commonly referred to as a "cookie." Many standard Web browsers support the use of cookies.

Distributable application. An application coded in a language, such as the JAVA language developed by Sun Microsystems, Inc., such that the application may be distributed over a wide area network, such as the Internet, and be successfully executed on a variety of computer hardware models running various operating systems.

Flame. In the context of an information exchange group, a flame is a user message of an offensive nature.

HTML (HyperText Markup Language). A standard coding convention and set of codes for attaching presentation and linking attributes to informational content within documents. (HTML 2.0 is currently the primary standard used for generating Web documents, although it should be appreciated that other coding conventions could be used within the scope of the present invention.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

HTTP (HyperText Transport Protocol). The standard World Wide Web client-server protocol used for the exchange of information (such as HTML documents, and client requests for such documents) between a browser and a Web server. HTTP includes a number of different types of messages that can be sent from the client to the server to request different types of server actions. For example, a 'GET' message, which has the format GET <URL>, causes the server to return the document or file located at the specified URL.

Hyperlink. A navigational link from one document to another, or from one portion (or component) of a document to another. Typically, a hyperlink is displayed as a highlighted word or phrase on a Web page that can be selected by clicking on it using a mouse or other pointing device to jump to the associated document or documented portion.

Hypertext System. A computer-based informational system in which documents other types of computer files are linked together via hyperlinks forming a user-navigable "Web."

Information Exchange Group. A general term encompassing a particular set of protocols or rules for information sharing, together with a particular set of shared information or data collected or generated under the associated rules and protocols, for use by users (or other sources) contributing information to, or accessing information in, the shared set of information. As implemented on the Web, information exchange groups include the entire Web and subgroups located on the Web, such as newsgroups, bulletin boards, message boards, chat rooms, and "Webrooms." Webrooms are further described in the detailed description below, and in the co-pending applications referenced therein.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

Spam. In the context of an information exchange group, spam is any unwanted user message or messages of a commercial nature.

URL (Uniform Resource Locator). A unique address which fully specifies the location of a file or other resource on the Internet. The general format of a URL is protocol://machine address:port/path/filename. The port specification is optional, and if no port is specified, the browser defaults to the standard port for whatever service is specified as the protocol.

World Wide Web ("Web"). Used herein to refer generally to both (i) a distributed collection of interlinked, user-viewable Web pages and other linked data and distributable applications that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Page. A hypertext file or document that is encoded using a language such as HTML for viewing on a client computer using a browser application. A Web page may include visible components, such as text, images, hyperlinks, and a background, and/or invisible components, such as meta tags and formatting instructions. In comparison to the term "Web page," the more general term "page" encompasses many other types of computer files that are not necessarily encoded for viewing using a browser, e.g., text files, bit-maps, audio files, and so forth.

Web Site. A computer system that serves informational content over a network using the standard protocols of the World Wide Web. Typically, a Web site corresponds to a particular Internet domain name, such as "electronsearch.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

The foregoing definitions are not intended to limit the scope of the present invention, but rather are intended to clarify terms that are well understood by persons having ordinary skill in the art, and to introduce new terms helpful for describing the present invention. It should be appreciated that the defined terms may also have other meanings to such persons having ordinary skill in the art. These and other terms are used in the detailed description below.

Referring to FIG. 1A, a block diagram is illustrated of a wide area network employing a method and system according to the invention. It is anticipated that the present information delivery system 100 operates with a plurality of computers which are coupled together on a wide area network, such as the Internet 102, or other communications network. FIG. 1A depicts a network that includes at least two user computers 120 and 130 that communicate with a Webroom Web host 110 though communication links 104 that include the Internet 102. The user computers 120 and 130 may be any type of computing device that allows a user to interactively browse Websites, such as a personal computer (PC) that includes a Web browser 132 (e.g., Microsoft Internet Explorer™ or Netscape Communicator™). Suitable user computers, e.g., user computer 130 equipped with browsers 132, are available in many configurations, including handheld devices (e.g., PalmPilot™), personal computers (PC's), laptop computers, workstations, television set-top devices, multi-functional cellular phones, and so forth. The Webroom Web host 110 includes a server computer 112 running Webroom Web server application 114 and capable of selectively delivering and receiving information, such as Web pages 126 and 136, to and from the user computers 120 and 130 using a protocol, such as HTTP. Webroom Web host 114 uses database 116, containing Webroom data, while performing functions according to the present invention. Typically, Webroom Web server 114 is an application coded in a programming language, such as C or C++, and is customized to run on server 112. Webroom Web server 114 may additionally incorporate a database engine, such as an SQL Server™ engine from Microsoft Corporation or Oracle™ database engine, as part of its architecture. Using user computers 120 and 130, user 128 and user 138, respectively, may communicate to one another by sending commands and data using browsers 122 and 132. User communication data is preferably accessible on Web pages 126 and 136, displayed on displays 124 and 134. Web pages 126 and 136 are preferably Webroom pages.

Figure 1B:
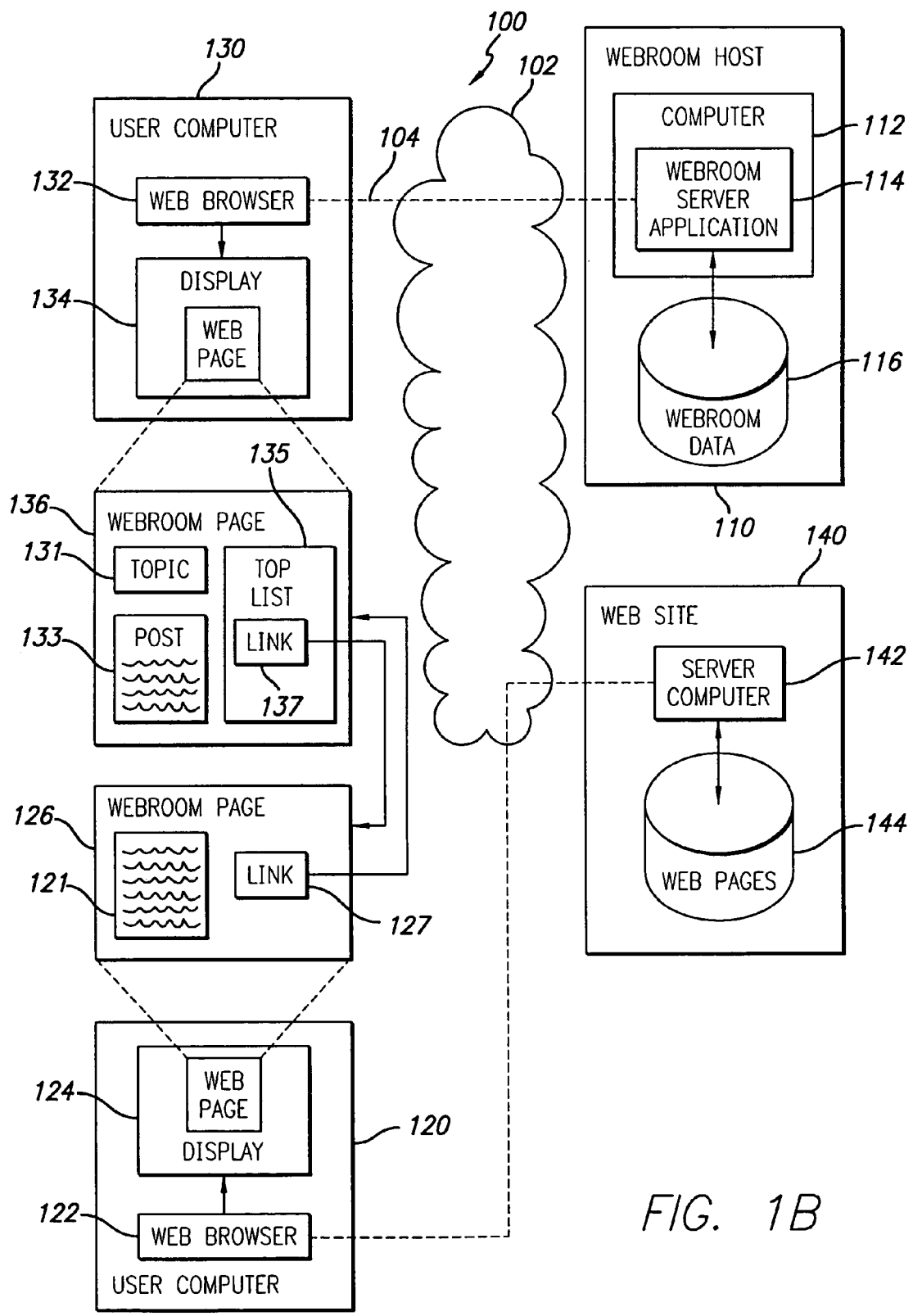
FIG. 1B is a block diagram illustrating an alternative embodiment of a computer system for providing Webrooms according to the present invention, and further illustrating some features of Webrooms according to the preferred embodiment of the invention.

Referring now to FIG. 1B, a block diagram illustrates an alternative embodiment of a computer system for providing Webrooms according to the present invention, and some features of Webrooms according to the preferred embodiment of the invention. In the alternative embodiment, in addition to the components and features discussed previously in connection with FIG. 1A, the system includes Web site 140. Web site 140 includes Web server 142 accessing a database of Web pages 144, and other electronic files containing information of various types, such as distributable applications and text files. Web pages 144 may be viewed on a display or a user computer, e.g., display 124 of user computer 120. For example, Web page 126 or other electronic files may be presented on display 124 by a suitable application program residing on user computer 120, such as browser 122, or by a distributable application provided to user computer 120 by Web server 142. It should be appreciated that many different user computers, many different Web servers, and many different search servers of various types may be communicating with each other at the same time.

Web pages are generally requested by communicating an HTTP request from a browser application, such as browser 132. The HTTP request includes the Uniform Resource Locator (URL) of the desired Web page, which may correspond to a Web page 136 stored at a destination Web site, such as Webroom Web host 110, or Web site 140. The HTTP request is routed to the Webroom Web host 110 or Web site 140 via the Internet 102. The Webroom Web server 114 or server 142 then retrieves the requested Web page, identified by a URL, from database 116 or 144 and communicates the Web page across the Internet 102 to the browser application 132 or 122. The Web page may be communicated in the form of plural message packets as defined by standard protocols, such as the Transport Control Protocol/Internet Protocol (TCP/IP), although it should be appreciated that communication using other protocols would be within the scope of the invention.

To exemplify features of Webrooms, FIG. 1B illustrates a Web page 126, containing information 121 and a hyperlink 127 to Webroom Web page 136, delivered to user computer 120 for viewing on display 124 using browser 122. At the same time, a Web page comprising Webroom Web page 136 is delivered to user computer 130 and displayed on display 134 using browser 132. Webroom Web page 136 contains posts 133 pertaining to topic 131, and a top list 135 including hyperlink 137 to Web page 126. Topic 133 pertains to information 121 on page 126, and thus Web page 126 may be of interest to someone viewing Webroom Web page 136. If so, hyperlink 137 may be selected which will cause server 142 to send a copy of Web page 126 to user computer 130. Similarly, Webroom Web page 136 may be of interest to someone viewing Web page 126, and if so, hyperlink 127 may be selected. Selecting hyperlink 127 causes Webroom Web server 112 to send a copy of Webroom Web page 136 to user computer 120. In connection with the request, Webroom Web server application preferably records the identity of the referring page, i.e., the page on which hyperlink 127 is located, for later use in determining placement of hyperlink 137 on top list 135, relative to other hyperlinks in the top list.

Figure 2A:
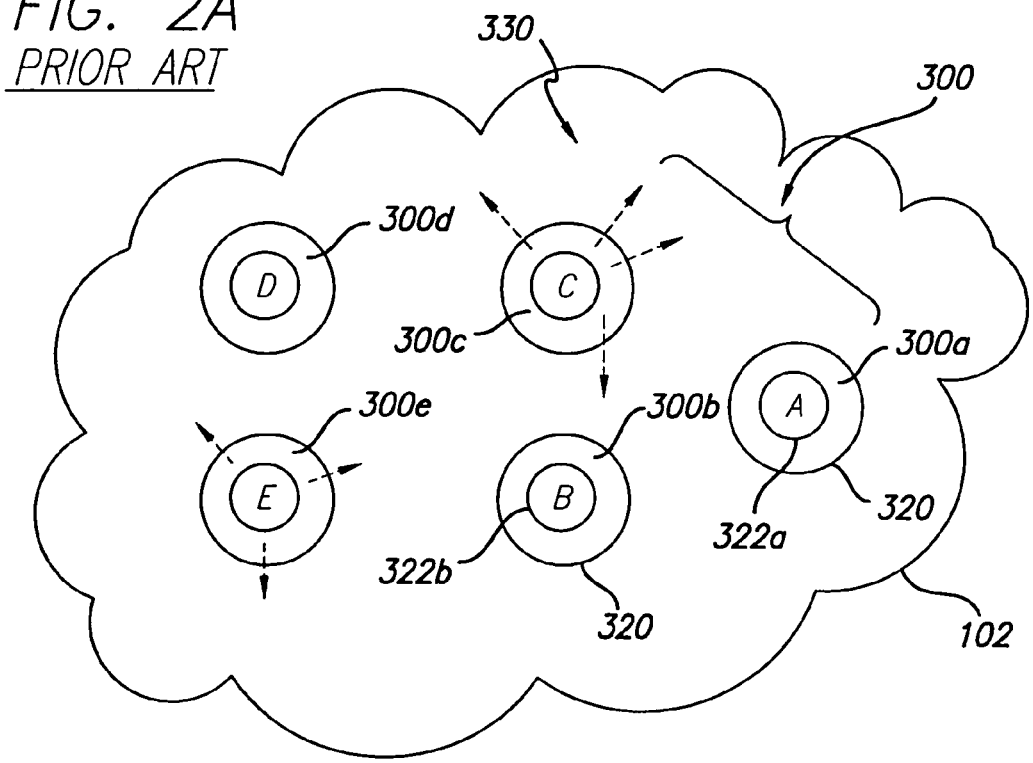
FIG. 2A is a concept diagram illustrating features of an information exchange group according to the prior art.
Figure 2B:
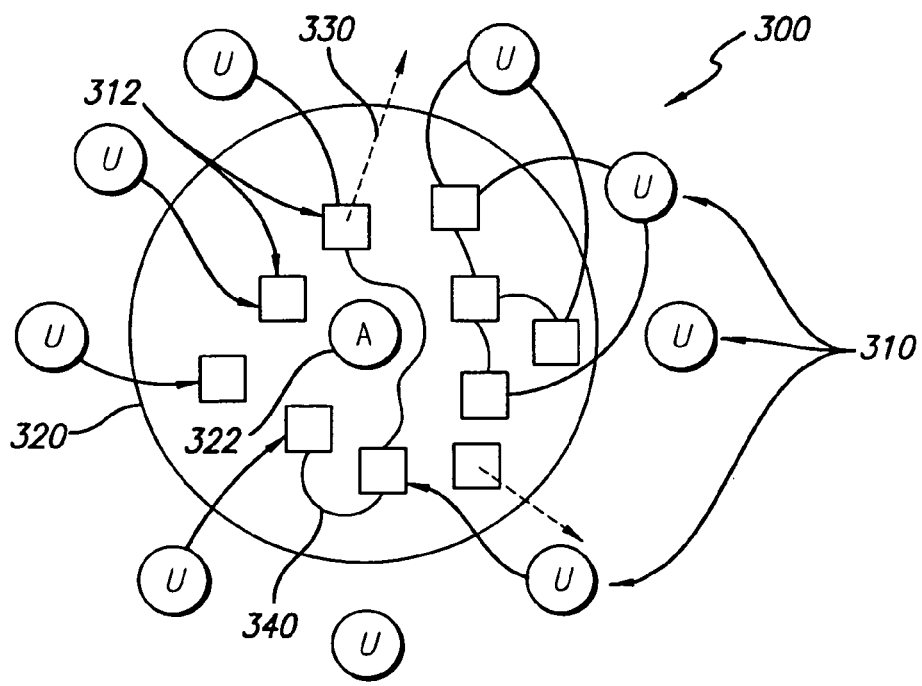
FIG. 2B is a concept diagram illustrating in more detail features of an information exchange group according to the prior art.

A principle advantage of the present invention is that it tends to provide information exchange groups that are topically organized and self-evolving. These features are illustrated and compared to prior art groups in FIGS. 2A-3B. FIG. 2A illustrates numerous prior art information exchange groups 300 located in an Internet space 102. Each prior art group 300 contains information posts 312, and a topic 322, such as topics 322a and 322b. Each post 312, shown in FIG. 2B, is received from a contributing user 310 on the Internet or other wide area network. Each post has a greater or lesser degree of relevance to the group's topic. The posts 312 are stored in one or more memories 320 connected to Internet 102. Memory 320 may be distributed over one or more memory devices, and is managed by a server device according to methods known in the art. To users 310, the posts 312 appear as objects on a Web page displayed on each user's client computer by a group server. Typically, the group server provides users 310 with an opportunity to receive, read, and respond to selected posts 312, and records a sequence of responses for each posting.

In prior art groups 300, the information posts are not organized according to their relevance to topic 322. This lack of contextual information is diagrammed in FIG. 2B as a random distance between each of posts 312 and the topic 322. Some of the posts 312 may be connected by a thread 340, which is essentially a record of a sequence of posts and responses. For example, a first post by a first user, and a second post by a second user, sent in response to a first post, are linked by a single thread. A third post, posted in response to the first message, would begin a second thread between the third post and the first post. In the alternative, a third post in response to the second post would continue the first thread from the first post, to the second post, and then to the third post. Any number of posts may be connected, or "threaded," in this manner. Although threading provides a limited amount of self-organizing information, in that the posts on a thread are more likely to relate to the same topic, prior art groups 300 do not provide a way for users to rate the relatedness of single posts or threaded posts to any particular topic. Consequently, information is randomly distributed among the posts 312, making searching for particular topical information a haphazard process for users 310.

Prior art groups 300 also do not provide for organizing links to other information exchange groups, Web pages, or other information located within the Internet space 102. Although some of the posts 312 may contain references 330 to external information, the references 330 are randomly scattered throughout posts 312, which posts 312 are themselves poorly organized with respect to the group topic 322. Because of their poor organizing properties, prior art groups 300 do not encourage or reward users 310 for submitting informative and relevant posts. For example, a user 310 is less likely to invest time and effort into submitting information, because the user's post will quickly become lost and forgotten. Hence, prior art groups 300 have tended to evolve into recreational-oriented communities with relatively little useful information content compared to Web sites operated by organized entities.

Figure 3A:
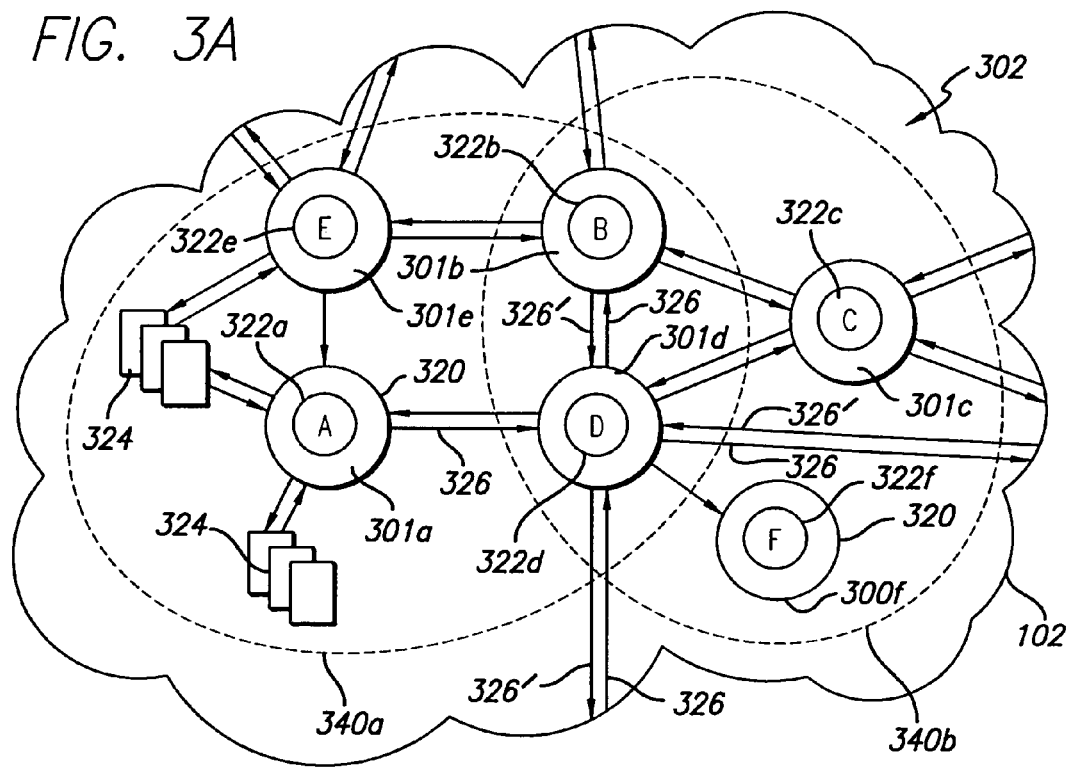
FIG. 3A is a concept diagram illustrating features of a Webroom.
Figure 3B:
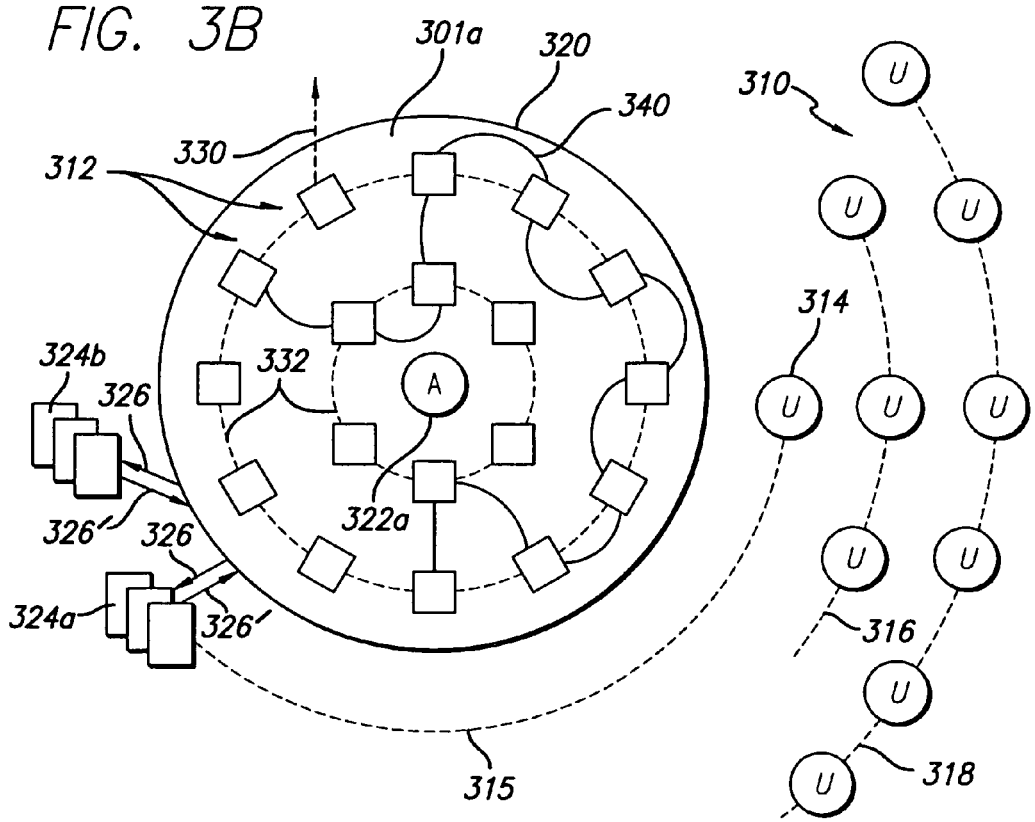
FIG. 3B is a concept diagram illustrating features of a Webroom in more detail.
Figure 4:
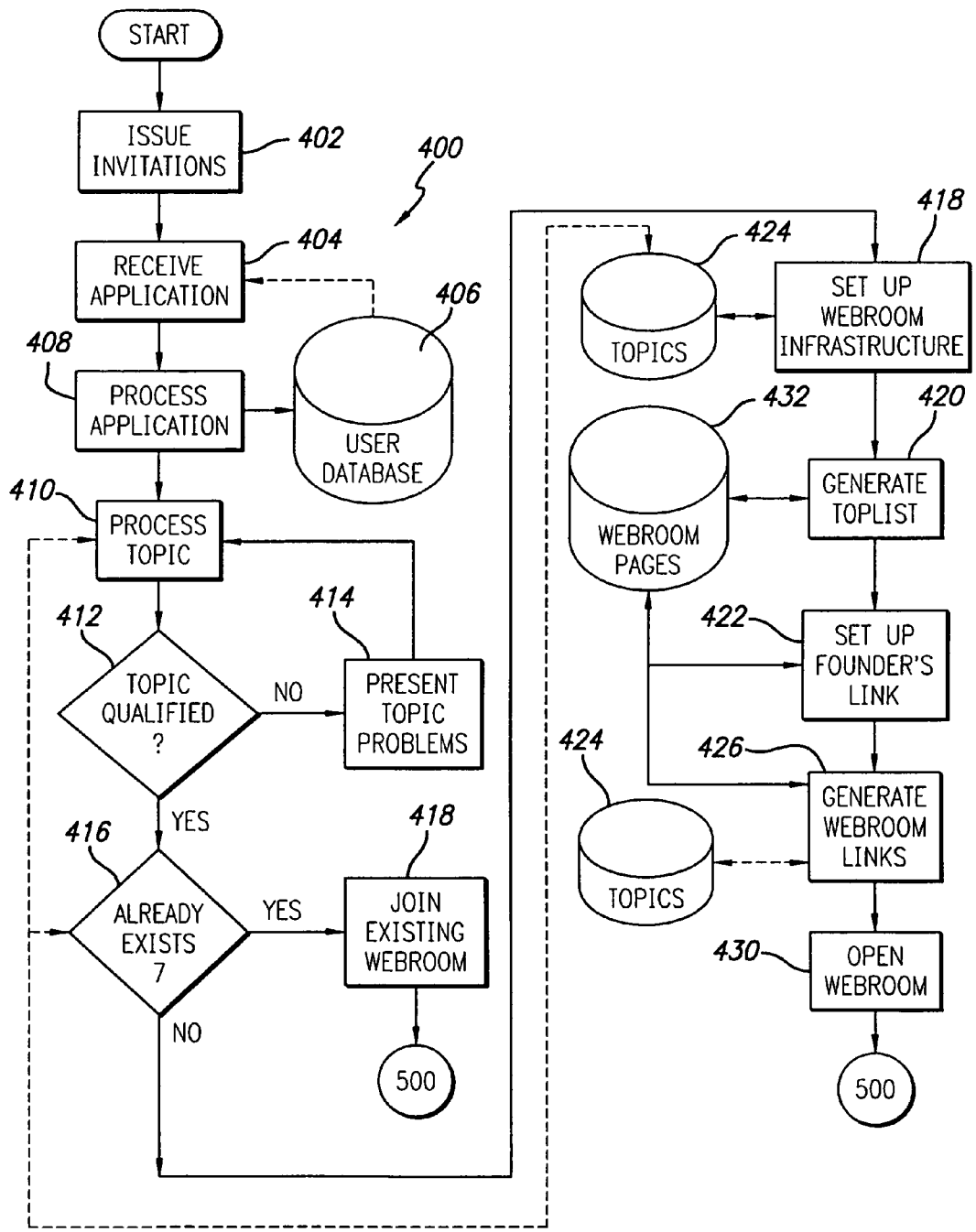
FIG. 4 is a flow chart illustrating a method for founding a Webroom.

In contrast, an information exchange group according to the present invention (a Webroom) has self-evolving properties that provide for topical organization within the Webroom, and within a structure comprised of multiple interconnected Webrooms. These properties are illustrated in FIGS. 3A and 3B. In FIG. 3A, a portion of a system 302 comprised of multiple interconnected Webrooms is shown. Webrooms 301a, 301b, 301c, 301d, and 301e, residing in an Internet space 102, are interconnected with multiple links 326 and 326'. Any particular Webroom, for example, Webroom 301d, may have one or more paired links, comprising a link to an external Webroom, such as shown between Webrooms 301d and 301b. Each paired link comprises a link to an external site 326 and a link back from the site 326'. As seen from the perspective of Webroom 301b, 326' is the link to the external site and 326 is the complementary link back. Webrooms may have one-way links, such as link 326 shown between Webrooms 301a and 301e, links to other Web pages 324 such as shown from Webroom 301a, links to prior art information groups 300f such as shown from Webroom 301d, and links to any other object having a network address. Each link 326 and 326' is preferably a hyperlink.

Webrooms are preferably provided with any number of defined topics, such as topics 322a, 322b, 322c, 322d, and 322e. The topics may be at any level of particularity or generality, and may be capable of grouping into any number of, and any levels of, subject groups, such as the subject groups illustrated by the areas 340a and 340b. Subject groups may be overlapping, or non-overlapping. In FIG. 3A, the subject groups 340a and 340b are shown as overlapping with respect to topics 322b and 322d. The configuration illustrated in FIG. 3A might arise, for example, if subject area 340a is "dogs," subject area 340b is "cats," and topic 322b is "pet toys" and 322d is "veterinary medicine."

It should be understood that the self-evolving interconnections of the present invention make it unnecessary to objectively define any subject areas. Rather, subject areas are conceptual constructs that arise from the nature of the interconnected structure provided by the present invention. Webrooms with the most closely related topics are directly linked, and more distantly related Webrooms are linked by a number of intervening links, the number of links being inversely proportional to the relatedness of connected Webrooms. That is, more closely related Webrooms are connected by fewer links. Thus, any particular subject area, although not objectively defined and having no distinct boundary, will nonetheless be perceived as a collection of Webrooms that are closely linked to each other. The present invention provides a method, as described in detail below, for providing Webrooms with inherent, self-evolving properties ensuring that only Webrooms with closely related topics will be directly linked to each other, and that each Webroom will grow or evolve links to all Webrooms having closely related topics. As a result, the topically organized, interconnected Webroom system 302 is capable of emerging from the participation of many individual, self-interested users, and evolving to higher levels of information and organization without the application of any external organizing agent or externally applied function.

The present invention also provides for topical, self-evolving organization within a Webroom defined by a topic, as illustrated in FIG. 3B. Webroom 301a, like prior art groups 300 discussed above, has a defined topic 322a, receives numerous information posts 312 from users 310 and stores them in a memory 320. Users 310 may receive, read, and respond to any of posts 312, and posts may be threaded, as shown with thread 340, or unthreaded. Unlike prior art groups 300, however, Webroom 301a ranks each post 312 according to its relevance to topic 322a. This ranking is illustrated by the concentric orbits 322, each orbit representing a discrete level of relevance to topic 322a. It should be understood that for simplicity, only two orbits 322 are illustrated, but a Webroom may have any number of orbits, and typically will have numerous orbits. Alternatively, posts 312 may be ranked according to an arithmetic system that does not use discrete relevance levels, and further may be ranked with respect to numerous ranking categories. Various ranking schemes are further described in more detail later in the specification.

Similarly, users 310 of Webroom 301a are preferably ranked according to various schemes. FIG. 3B illustrates an orbit system, having one founding user 314 on a founder's orbit, a number of users 310 on an expert orbit 316, and a greater number of users 310 on a contributing user orbit 318. Only three orbits are shown for simplicity, but a typical Webroom will have more numerous orbits, or a more sophisticated ranking scheme, which is described in more detail later in the specification. Users are provided an option to rate selected posts 312. Rating information pertaining to selected posts 312 is received from users according to methods discussed below, and used to rank the posts 312 and users 310. As a result of the ranking scheme, users compete for a favorable position for their posts with respect to topic 322a by submitting posts of superior information value, by providing links to desired information resources, and by providing rating information.

An advantage of the invention is that users are rewarded for contributing high-quality information by achieving highly ranked positions. In general, one skilled in the art will recognize that the prominence and recognition associated with a high ranking among a group of many users may readily be used to bring benefits of many types, e.g., to draw traffic to a commercial site. Thus, by its ranking and reward system, the Webroom 301a tends to attract more desirable and relevant information pertaining to topic 322a, and ranks the best information highly so it may easily be found by users. This in turn attracts more users, who in turn provide still more and better information and assist with organizing the Webroom, and so forth. Additionally, ranking users makes it easy to identify experts and request information from them. Thus, by ranking information and users, Webrooms, such as Webroom 301a, tend to promote themselves and grow to become increasingly more useful information resources through a powerful network effect.

Like prior art groups 300, Webrooms, such as the illustrated Webroom 301a, also may have posts with external references 330. However, the present invention provides a method for providing, organizing, and ranking links to outside references, as described above in connection with FIG. 3A. In FIG. 3B, one such pair of links 326 and 326' is illustrated to a founder's page 324a. A founder's page is a Web page or other document designated by a founding user 314, as indicated by the dashed line 315. By providing a link to a site designated by user 314, and ranking the link highly or displaying it prominently, user 314 is rewarded for investing the time and effort required to found Webroom 301a. Similarly, other users 310 may be rewarded for contributing to the Webroom 310a, for directing traffic to a Webroom through a linked Web page, for sponsoring the Webroom host, or for other desired behavior, by being permitted to designate or nominate a link to another Web site, such as 324b. External sites preferably have a return link 326' to the Webroom 301a, and the usage of each return link 326' is preferably measured. External sites with links to and from Webroom 301a preferably include other Webrooms, as illustrated in FIG. 3A and discussed above.

Like posts and users, links 326 are preferably ranked using rating data provided by users 310. Additionally, it is preferable to include the amount of Web traffic provided by a site's return link 326' to the Webroom 301a as a ranking factor, to encourage and promote Webroom traffic. Commercial factors, such as payment and contractual terms, may also be considered in ranking, preferably using a weighted system as described in the co-pending U.S. patent application Ser. No. 09/548,803, still pending, "METHOD AND SYSTEM FOR SEARCHING A WIDE AREA NETWORK," filed Apr. 14, 2000, which application is specifically incorporated herein, in its entirety, by reference. In this manner the costs of hosting Webrooms may be defrayed, and a profit motive for hosting and promoting Webroom growth may be provided. However, to ensure that external sites with the most closely related topics and best information receive the highest ranked links, thereby optimizing the topical organization and information content of the system 302, the highest importance in the rating scheme is preferably assigned to topical rating information.

The general characteristics of Webrooms, and systems of Webrooms, are preferably achieved on a wide area network, such as the Internet, by implementing the method steps of the invention using computer hardware, network connections, and software according to techniques known in the art. Various method steps are illustrated in FIGS. 4-15, beginning with steps for founding a Webroom illustrated in FIG. 4.

It is preferable to the harness the power of a volunteer user base for founding Webrooms, for the same reason it is preferable to harness a volunteer user base for providing rating data. Namely, the vast number or users connected to the Internet comprises a resource of enormous size and power, and volunteers do not need to be paid. In some cases, it may be desirable to pay or contract with founders to found Webrooms, or some combination of paid contractors and unpaid volunteers may be used for founding Webrooms. The method illustrated in FIG. 4 may be adapted for use with these various types of founders.

The process begins by issuing prospective founders an invitation to found a Webroom at step 402. An invitation is extended by various advertising techniques known in the art, for example, using a banner advertisement on a search engine site, or by any mode of communication. However, it is preferable to extend invitations by direct messaging to persons searching for a Webroom using a search method, such as disclosed in the previously referenced U.S. patent application Ser. No. 09/548,803. An invitation is preferably extended when a user is unable to locate a Webroom for a particular topic, because no Webroom having that particular topic exists. Such persons are more likely to be interested in the topic and in Webrooms, and therefore are more likely to accept an invitation to found a Webroom covering the particular topic. Additionally, the invitation/acceptance process can readily be handled automatically using techniques known in the art, without any need for a human on the Webroom host side, thereby reducing the cost of founding Webrooms.

At step 404, the founder applicant applies for founder status and the applicant's application is received, beginning a dialog between the applicant and the Webroom host. An applicant may apply by sending a message to the Webroom host, which may be comprised simply of a mouse click or other simple response, and preferably includes, or is linked to, other application data including the identity of the applicant and the applicant's client terminal, name and electronic address information, the topic, and selected founder résumé information, such as other Webrooms the applicant has founded. If the applicant is already a registered Webroom user, most of this information is preferably already stored in a user database 406, from which it may readily be retrieved. The Webroom processes the application information at step 408 to ensure the application is complete, and stores new information in user database 406 for later use.

The topic submitted by the applicant, or otherwise associated with the application, is preferably processed at step 410 for recognition of the language the topic is submitted in, identification of misspellings, and identification of non-dictionary words, and other topic problems. For example, the host may screen for words deemed too offensive to appear as topics, or words that are otherwise likely to be used for Webrooms that the Webroom host does not desire to host. However, it is anticipated that in general, topic processing is preferably limited to identifying common spelling defects, semantic inconsistencies, and duplicate topics, in order to avoid placing unnecessary restrictions on topic creation and to facilitate the founding process. Elimination of undesirable and unused Webrooms takes place later during the Webroom cycle, by a user-driven rating process described in more detail later in the specification. Topic database 424, and/or a database containing dictionary information (not shown) may be consulted during the topic processing step.

If a problem with the topic is identified during processing, the topic is deemed not qualified at decision step 412, and the topic problems are presented to the applicant at step 414. Depending on the nature of the topic problems, the applicant is invited to correct the problems and resubmit the topic for processing at step 410, or to accept the topic as is, which may be appropriate, for example, if the topic includes a word or phrase that is not in the system dictionary database, as may occur with new slang terms. In such cases, the applicant is preferably invited to supply a meaning for the undefined term, so that the term may be added to the topic and dictionary databases with a defined meaning. The topic is then preferably reprocessed at step 410 using the corrected terms and/or new definitions.

If the topic is deemed qualified at step 412, then at step 416, the topic is tested to determine if a Webroom with the same topic already exists. Unlike many prior art information exchange groups, it is preferable to prevent the formation of duplicate Webrooms, i.e., two or more Webrooms having essentially the same topic, to promote topical organization within a Webroom system, and to concentrate all possible information pertaining to a topic within a single Webroom. Thus, in performing testing for duplicate Webrooms, it is preferable to check for and prevent founding of Webrooms with synonymous topics. For example, two Webrooms, one with the topic "quadruped bovines", and one with the topic "four-legged cows" would be undesirable. At the same time, overlapping, partially synonymous topics are permissible and often arise because of a genus-species relationship, for example, "Jersey cows" and "cows." If it is determined at step 416 that a Webroom already exists for the topic, at step 418, the applicant is referred to the existing Webroom, for use according to the method 500 illustrated in FIG. 5.

If there is no pre-existing Webroom for a topic, a Webroom infrastructure for the topic is set up at step 418. Infrastructure, for the purposes of step 418, comprises a defined topic stored in topic database 424, and one or more linked Webroom pages, including any associated or embedded applications, stored in Webroom page database 432 (or more generally, in a host memory comprising Webroom database 116 shown in FIGS. 1 and 2). Webroom pages are Web pages having certain features, some of which have already been described, and which will be described in more detail later in the specification, including graphical objects and embedded applications for receiving posts of information from users, providing users an option to receive posts, and displaying or otherwise outputting posts to users, providing users an option to individually rate each post, receiving rating data from users regarding selected posts, and providing users an option to receive rating data in various formats. Being a species of Web page, Webroom pages may be generated according to methods known in the art, using a variety of known methods to build Web pages having features with the characteristics and functionality as disclosed herein. It is anticipated that only a limited number of Webroom infrastructure pages, i.e., template pages, need be developed for this purpose. Such template pages are essentially empty forms and will be the same or similar for a wide variety of assigned topics, for a given user language and programming environment. The applicable template pages are then copied, assigned a unique address, associated with and modified for the defined topic, and stored in a host memory.

At this point, the Webroom pages are ready to serve as the user interface for receiving, rating, ranking, linking, storing, and performing other operations on information, and providing options to users, according to the methods of the present invention. It should be noted that steps 402 through 418 discussed thus far comprise a process for, among other things, defining a topic prior to receiving posts of information. It will be evident to one skilled in the art that many variations on the described defining process are possible. Whatever particular process is used, it is preferable to define a unique topic for each Webroom that has a clear and recognized meaning. Also, it is preferable to draw upon a general user base to assist with topic definition, using an automated or semi-automated process, for the reasons explained above.

At step 420, an initial list of preferred links to related external sites, called a "toplist," is generated and stored in database 432 for display on the Webroom pages. Preferably, the content of the toplist will change during the life of the Webroom, based on new links and rating data provided by the users. Initially, the toplist may be left empty, but it is preferable to provide an initial list. An initial list may be provided based on a search for related Web pages using the topic words as keywords. A search may be performed automatically by submitting the topic words to one or more search engines known in the art, and selecting a portion of the search results, for example, the top twenty-five results, on the top list. In addition, it is preferable to provide the Webroom founder with an opportunity to provide addresses for inclusion in the initial toplist.

Preferably, the founder is also provided with an option to designate an address for a Web page of the founder's choice, called a "founder's link," for inclusion in the toplist. At step 422, the address is received from a founding user and added to the toplist in the manner described above, thereby providing a link on the Webroom page comprising the founder's address. The founder's link preferably receives more favorable treatment relative to other links on the Webroom page. For example, the founder's link may be displayed more prominently than other links, or may be exempted, at least during an initial period, from a ranking and review system that is used to remove unused links from a toplist. In this way, a founder may be rewarded for the time and effort invested in founding a Webroom. At the same time, as a Webroom grows in popularity and users over time, it is preferable that the founder no longer be provided more favorable treatment, and be required to compete evenly with other users. A "level playing field" encourages participation from all users and continued addition of new information to the Webroom. Also, as a Webroom grows in popularity, founder status becomes more and more valuable. At some point, the value of founder's link and other forms of preferential treatment greatly exceeds the value of the founder's original contribution. This provides an additional reason and incentive for requiring new contributions of some type to justify a continuing preferential status.

As a final step in the infrastructure set up process, an initial list of links to related Webrooms is generated, similarly to the toplist. The Webroom topic database 424 is searched according search methods known in the art, and a list of related Webrooms is identified. A portion of the Webrooms are selected, for example, the top twenty-five, for inclusion on the initial list. As with the toplist, the content of the Webroom list is anticipated to change over time, depending on relative use and rating information for each related Webroom.

With a defined topic, a toplist, and an initial Webroom list, the newly established Webroom is ready to be opened to the public, in an opening step 430. Network access for the general user community to the Webroom pages is enabled, as is access to the Webroom databases using the Webroom pages. Network traffic is directed to the Webroom pages using a variety of methods known in the art for directing traffic to a particular page. For example, the Webroom page may be registered with numerous search engines. Additionally, links, such as banner ads, may be placed on other popular pages, particularly those dealing with related topics. It is further anticipated that many founders will be interested in directing traffic to their Webrooms, and will do so by contacting their respective communities in various ways. When set-up is complete and users begin linking to the Webroom page, the Webroom preferably operates according to the method 500 illustrated in FIGS. 5A and 5B It should be appreciated that a Webroom may be established in other ways than described above, and need not always start with an empty template. For example, an existing chat room or news group may be converted into a Webroom by the addition of Webroom features described above. In such case, objects for receiving and responding to posts would already be present on the Web page, and would be linked to a database of pre-existing posts. However, it is anticipated that even if some Webrooms are formed by converting existing, prior art information exchange groups, it will be necessary to create new Webrooms to meet user demand for new topics, and to expand the range of topics covered by a Webroom system.

Figure 5A:
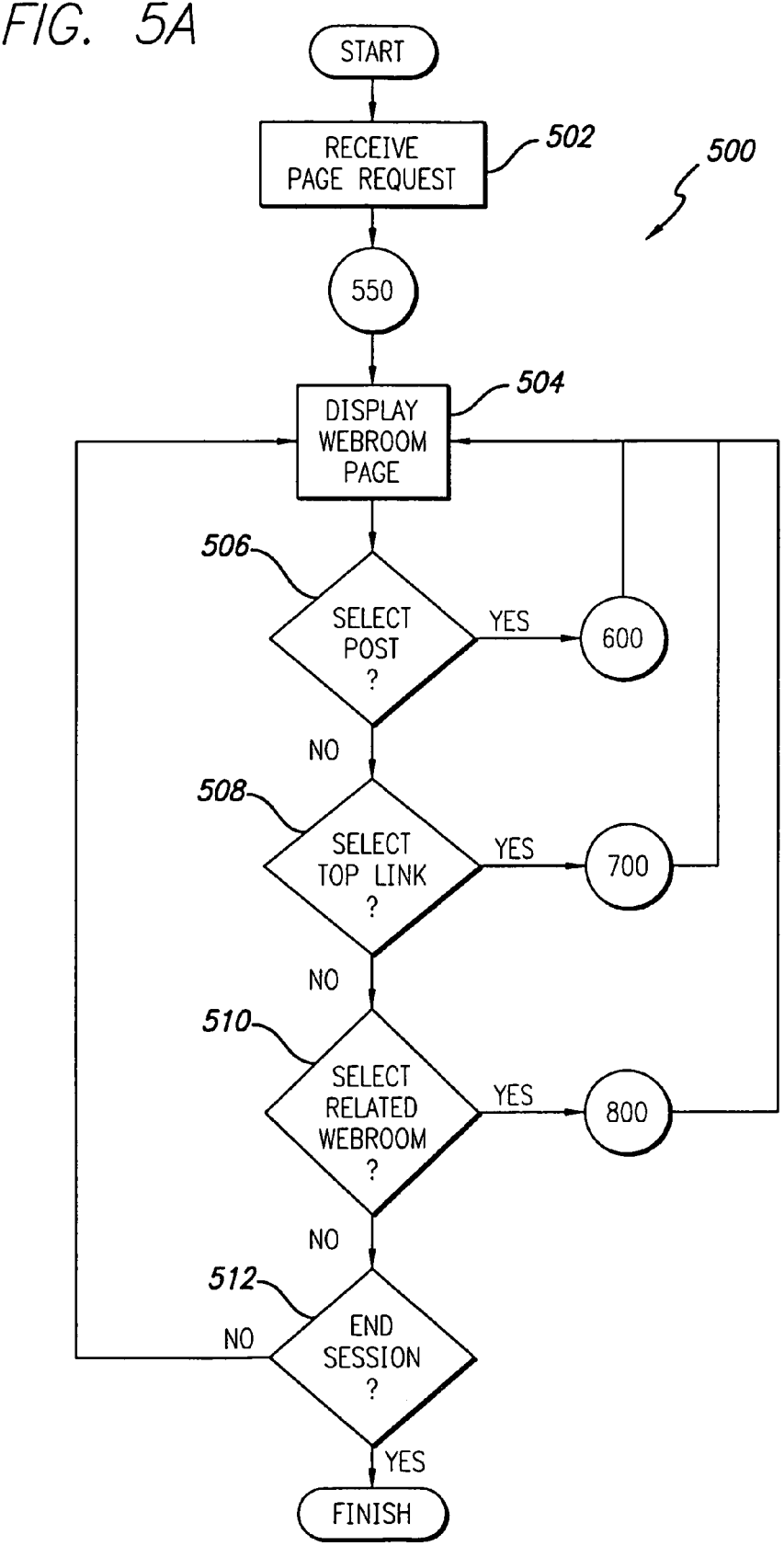
FIG. 5A is a flow chart illustrating a method for operating a Web page menu for a Webroom.
Figure 5B:
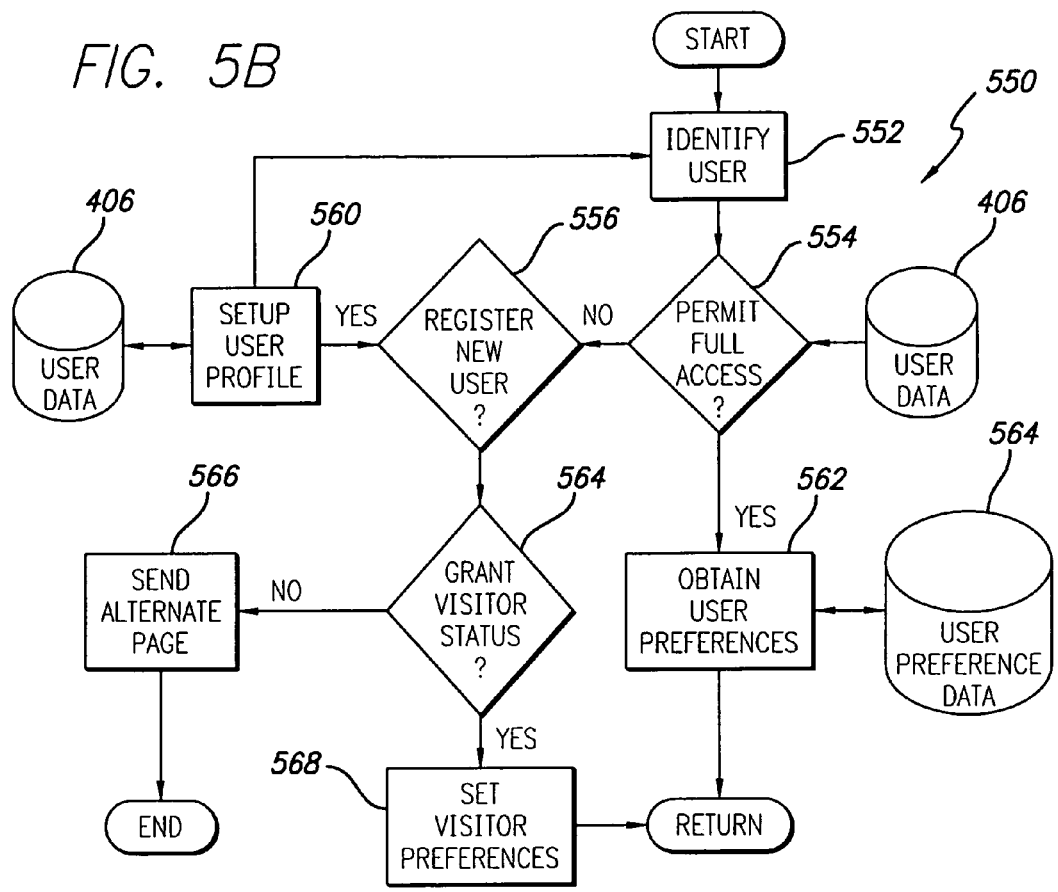
FIG. 5B is a flow chart illustrating a registration and login method for a Webroom.

Referring to FIG. 5A, at step 502, the Webroom server receives a request for a Webroom home page from a user. The server then initiates a login process 550, shown in more detail in FIG. 5B. At 552, the requesting user is identified. This may be handled by a login script and password, which is preferred for more secure systems or to accommodate users accessing the system other than from the users' usual computer. Alternatively, the user may be identified by reading a cookie or other identifying information on the user terminal, or by any other identifying method known in the art. After the user is identified, a database of user data 406 is checked to determine if the user is authorized for full system access, at step 554. Preferably, a user is authorized to view a portion or all of the Webrooms on the system after registering only once. Portions of the Webrooms may be restricted or open to particular users, depending on the identifying information. For example, if the identifying information indicates that the user is a minor, access to Webrooms with adult-only content could be restricted. For further example, a particular group of users may set up one or more private Webrooms for access only by members of the group, in which case access to the private Webrooms will be blocked unless the user is identified as a group member.

If the user is identified as a registered user, user preferences for the requested Webroom are established at 562. In most cases, the user will adopt a set of default preferences to begin with, and will retain the option of modifying the default preferences for each particular Webroom. User preferences are stored in a database 564 of user preference information.

Further discussion of user preferences is provided later in the specification in connection with FIGS. 13A, 13B and 13C.

If the user is not identified as already existing in the user database 406, at 556, the user is provided with an option to register as a new user. If the user selects the option, a user profile is established at step 560. Various amounts of identifying information may be collected for the user profiles, depending on the objectives of the system. In general, it is preferable to balance various considerations, such as ease of use, privacy, and accountability, in determining how much information to collect. It is also possible to link a user status with the amount of information provided; for example, users who provide little identifying information could be prevented from attaining a high user status in the system. After the identifying information has been collected and stored in user database 406, the login process resumes at step 552, as before.

If the user does not wish to register as a new user, the user is provided an option to register as a visitor at step 564. If the user does not wish to register as a visitor, the user is preferably directed to one or a series of exit Web pages according to the preferences of the Webroom operator. For example, the user may be directed to a Webroom welcome page, that explains the benefits and operation of Webrooms and contains advertising messages. If the user elects to receive visitor status at step 564, then a temporary identification and a set of visitor preference data are assigned at step 568, typically by reference to a default database, similarly to step 562. To encourage visitors to register as users, visitors are preferably prevented from accessing the full Webroom feature set, and receive a message encouraging them to register as users when they attempt to use a restricted feature.

After the login process is complete and user or visitor preferences are established, at step 504, shown in FIG. 5A, a first Webroom page (a "root menu" page) is displayed at the user terminal. The root menu page preferably displays a summary of one or more postings in the Webroom database, a list (or a link to a list) of toplinks, and a list (or a link to a list) of related Webrooms. Additionally, the root menu page preferably has a menu providing users with various Webroom options, for example, options for setting user preferences, and may include one or more advertising messages. Various options are diagrammed as steps 506, 508, and 510 in FIG. 5A. It should be noted that, although the foregoing steps are diagrammed as sequential steps, one skilled in the art will recognize that the steps may be selected in any sequence from the root menu.

A substantial portion of the root menu page is preferably used for displaying a sequence of user posts. A "post" typically comprises a text message composed or provided by a user, but may include or comprise an audio file (such as a recording of the user speaking), graphical files, such as video or still photographs in various file formats, application files, such as content files for use with word processing and spreadsheet applications, and other forms of user content files. However, depending on the bandwidth, processing and memory constraints imposed by the Webroom server, it is preferable to limit the file size of user posts, and/or to require that posts be submitted in one or more designated file formats, e.g., as text files. The summary of posts displayed on the root menu page preferably displays summary information about each post, such as the contributing user identification, date and time submitted, subject line information, and length of the posting.

Textual posts are preferably displayed in their entirety, or in summary, depending on whether or the display is organized chronologically (i.e., is unthreaded) or as threaded on subject threads. Chronological postings are preferably displayed in their entirety, to permit rapid scanning of all material submitted within a given time frame. Threaded postings are preferably displayed in summary, so that more of the subject threads can be viewed on a single screen. Depending on user preferences, various other combinations of summarized or entire posts may be displayed.

Figure 5C:
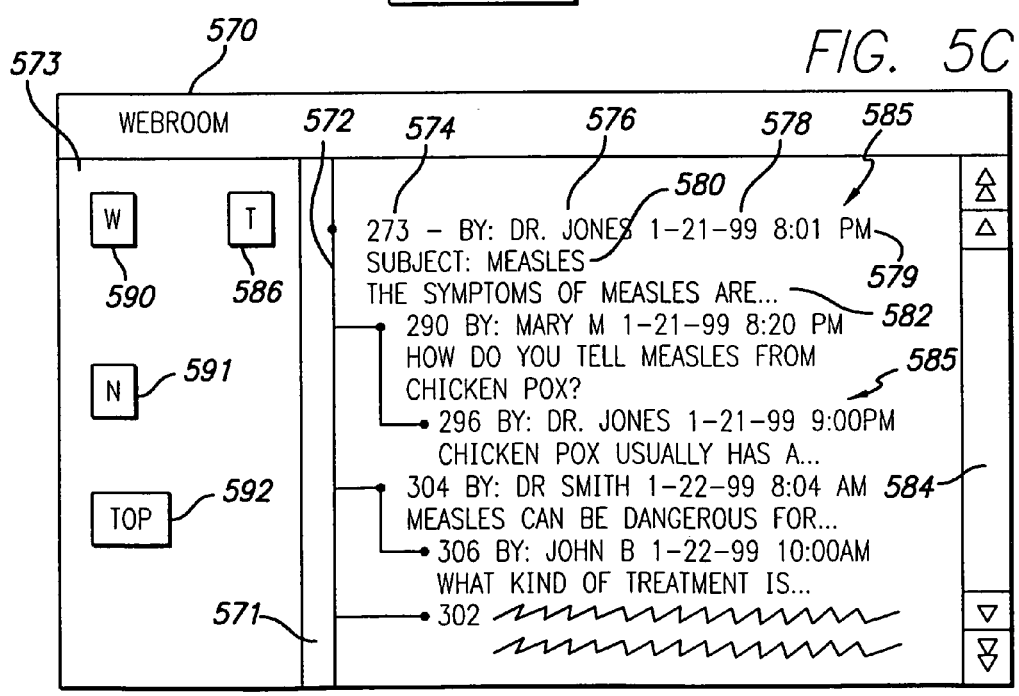
FIG. 5C is an illustration of an exemplary display of a Web page for displaying posts grouped according to a subject thread, with various Webroom menu objects.
Figure 5D:
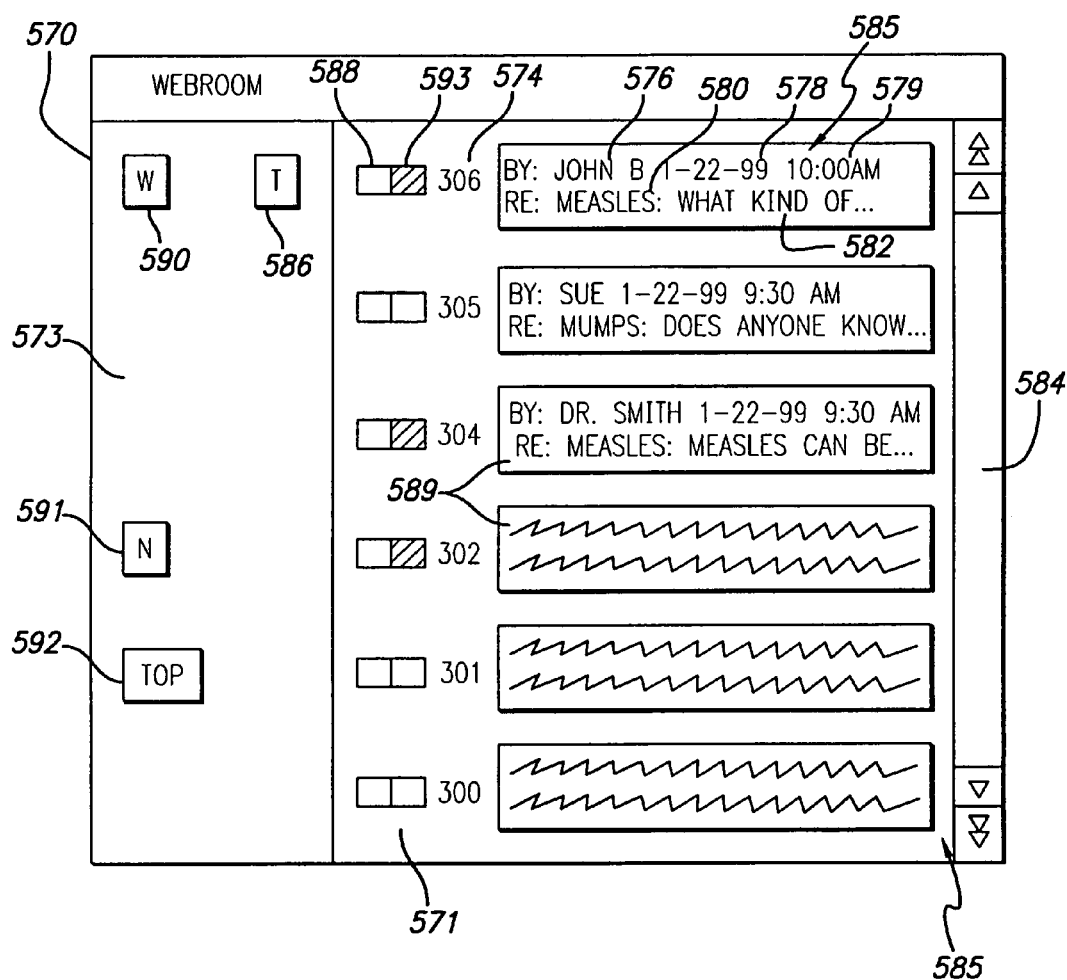
FIG. 5D is an illustration of an exemplary display of a Web page for displaying posts that are not grouped according to a subject thread, with various Webroom menu objects.

Additionally, the root menu page preferably provides for display of the posts, or summary of posts, in various orders and groupings, as shown in FIGS. 5C and 5D. Webroom page 570 is preferably comprised of one or more frames 571 and 573. Posts 585, comprising subjects 580 and messages 582, are summarized in a format showing various summary objects such as a post ID number 574, the contributing user 576, post date 578, post time 579, subject 580, and an initial portion of the message 582, for each post. In FIG. 5C, the posts 585 are grouped and ordered according to their position on a subject thread 572. For example, post No. 290, by user "MaryM," is in response to post No. 273, by user "DrJones," regarding the subject of measles. Post No. 296, by DrJones, is in response to the post by MaryM, and post No. 304 is in response to the initial post by DrJones. Thread 572 displays the relationship of posts and responses giving rise to the subject thread. The summary of posts 585 may preferably be scrolled using a familiar interface device, for example arrow keys on a keyboard, a computer mouse, and/or a graphical device such as scroll bar 584. One skilled in the art will recognize that a wide variety of formats for displaying posts grouped according to a subject thread are possible, wherein each format groups posts and their associated responses in order of response.

Page 570 preferably includes a toggle object 586, for providing users an option of selecting a variety of formats for displaying the posts 585. Object 586 is preferably a graphical object, such as a button or radio box, that can be selected and activated by "pointing and clicking" using a pointing device, such as a computer mouse. Object 586 may be located in the same frame 571 as posts 585, or it may be located in a separate frame 573, which preferably contains other command menus and command objects, such as objects 590, 591, and 592.

By activating toggle object 586, a user can toggle between two or more formats for displaying posts 585. For example, a user may select to view posts 585 in reverse chronological order of submission, as shown in FIG. 5D. In this view, frame 571 contains a summary of the Webroom posts, beginning with the most recently submitted posts and proceeding to the oldest posts. The post summary objects are preferably the same, or similar to the summary objects as displayed in threaded format. However, the unthreaded (i.e., not grouped according to a subject thread) format preferably includes one or more rating icons 588 and subject icons 593 associated with each post. The rating icons 588 preferably indicate rating information pertaining to each post. For example, rating icon 588 might reveal five stars for the most highly rated posts, with a lesser number of stars for lower rated posts; one or more iconic candle flames indicating the degree to which users have rated the post to be a flame; and one or more orange blobs indicating the degree to which users have rated the post to be spam. In the alternative, rating icon 588 might reveal a numeric score for various rating categories.

Subject icon 593 may be provided to indicate a particular subject thread that pertains to the post. For example, all posts relating to a particular thread may be coded with a particular color. In the alternative, each post background is preferably provided with a colored background 589, color coded to relate to a particular subject thread. Color coding permits a user to view all postings in chronological order as they are submitted (or other order), while retaining subject thread information for each post. It should be noted that a wide variety of formats for coding rating information and subject threads for a list of postings may be used within the scope of the present invention. Additionally, posts may be summarized in a variety of orders, for example, according to a rank determined by post rating data, or as a combined function of date and time submitted and a post rank based on user-provided data.

Page 570 is preferably provided with a related Webrooms button 590. Upon actuation, button 590 displays other Webrooms which are deemed to be related to the currently viewed Webroom. In preferred embodiments, users who have passwords and can post in the Webroom are eligible to nominate and vote on whether a Webroom is related to another Webroom. Users who believe that one Webroom should have a link from another Webroom (and thus be related) can nominate the Webrooms to be related via a nominated Webroom button 591. In one embodiment, nominated related Webrooms both appear on a list that exists on each respective site (thus, site A appears on the list of nominated related Webrooms on site B, and vice versa). Members of both Webrooms then have the opportunity to review the other Webroom and determine if that Webroom should appear on the list of related Webrooms, by rating the Website accordingly. The ratings from both Webrooms are then aggregated, and, once a minimum amount of rating data is received, a determination is made as to whether the rooms will be listed on the "related Webroom" list or link, as discussed later in the specification. If a Webroom (A) is found to be related to another Webroom (B), both Webrooms may appear on a list of related Webrooms when a user views one or the other Webroom, depending on various factors such as the amount of traffic the Webroom receives and the number of links already listed on the Webroom related links list. For example, if Webrooms (A) and (B) are related, and (A) relates to a general topic receiving a large amount of traffic, while (B) relates to a narrowly defined topic with relatively little traffic, then a link to Webroom (A) may appear on Webroom (B), while Webroom (A) does not contain a link to (B). In the alternative, if Webroom (A) has relatively few links (which may occur, for example, when it is relatively new), then the link to (B) may appear on the (A) list until the (A) list contains a predetermined number of links.

Page 570 preferably includes a toplink button or menu object 592 for presenting links to related Web pages (that are not Webrooms), similar to the process described for Webrooms in connection with Webroom button 590. The process of linking to, and rating links to, related Web pages (and Webrooms) is described in more detail later in the specification. Additionally, a button (not shown) for nominating related Web pages, similar to button 591 for Webrooms, may be provided. In general, it should be understood that Webroom page 570 is not limited to display of the objects discussed in connection with FIGS. 5C and 5D, and may contain various other objects, such as advertising messages, help buttons, search objects, text objects, and graphical objects of various kinds. Additionally, the arrangement of the objects is not limited to the arrangement described, and one skilled in the art will recognize that various other arrangements of the above elements will be within the scope of the invention.

Figure 6A:
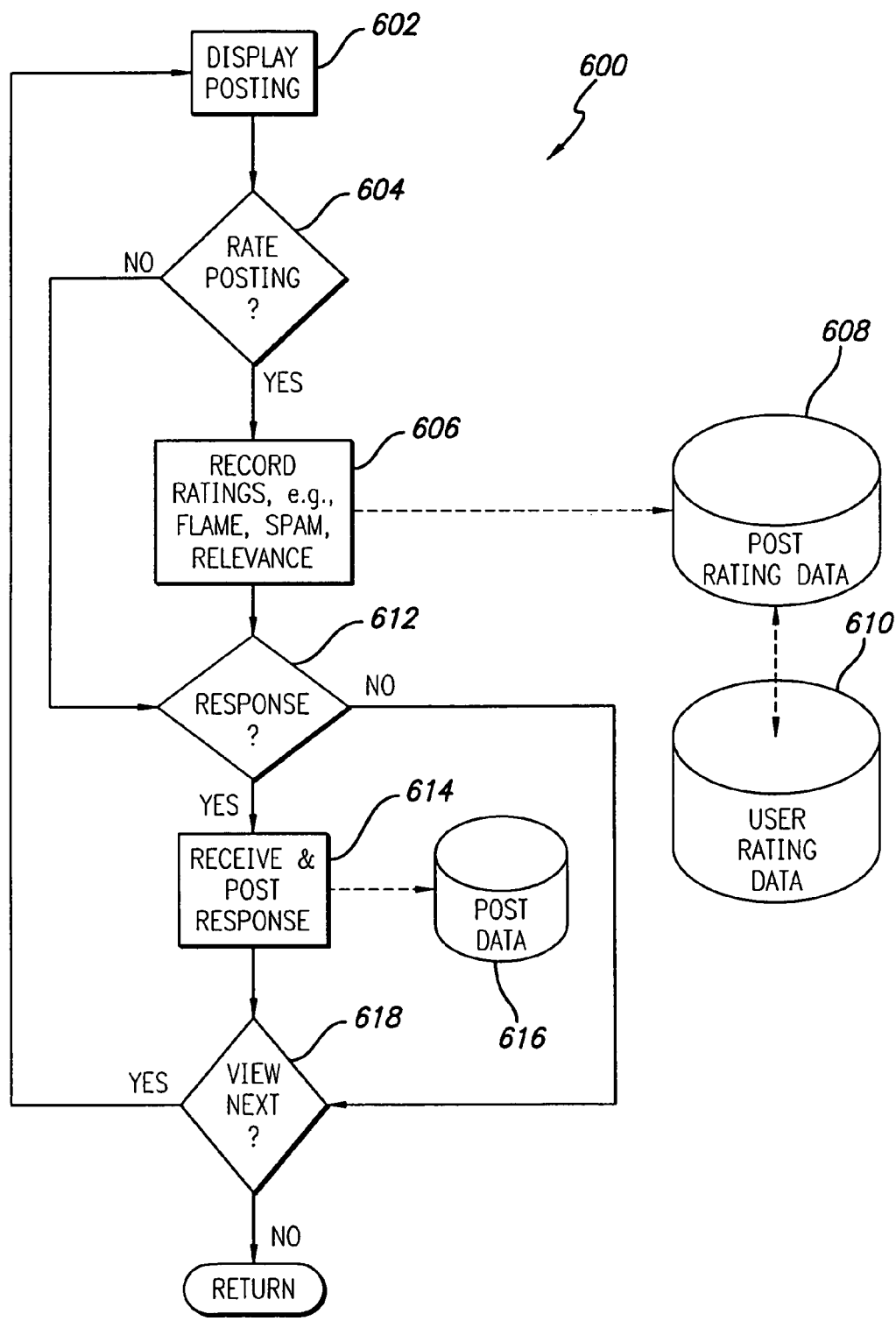
FIG. 6A is a flow chart illustrating a method for providing users an option to view, respond to, and individually rate information posts stored in a Webroom memory.

Referring again to FIG. 5A, at step 506, users are provided an option to receive posts. If a user selects the option, a post display step 602 is initiated, as shown in FIG. 6A, for displaying the full posting at the user's terminal. Preferably, every post summary format provides each post with at least one object that may be selected to view the entire post, preferably in a new window or frame. It should be noted that "display" is used in a general sense. For example, if the post comprises an audio or video file, the audio or video file will be played at the users terminal, along with a display of any supplemental information. Additionally, users may be provided with an option to receive text messages in an audible format by incorporating a text-to-speech engine, of which several are known in the art, as part of the Webroom application package. Posts may be displayed in numerous ways familiar to those skilled in the art, for example, using a distributable application window that is continually updated as new posts are added to the Webroom database.

Figure 6B:
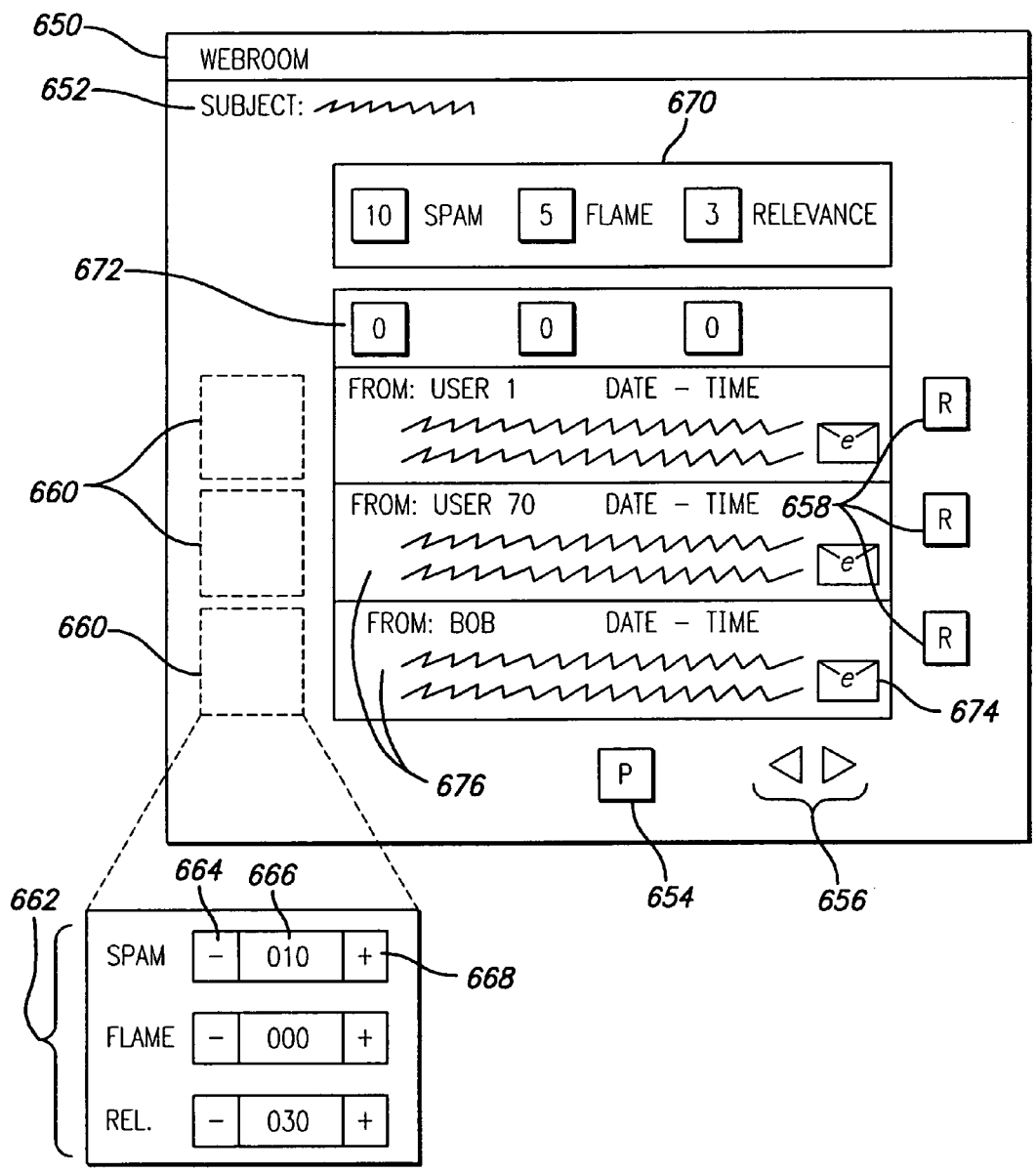
FIG. 6B is an illustration of an exemplary display of a Web page provided with features for providing users an option to rate posts.
Figure 6C:
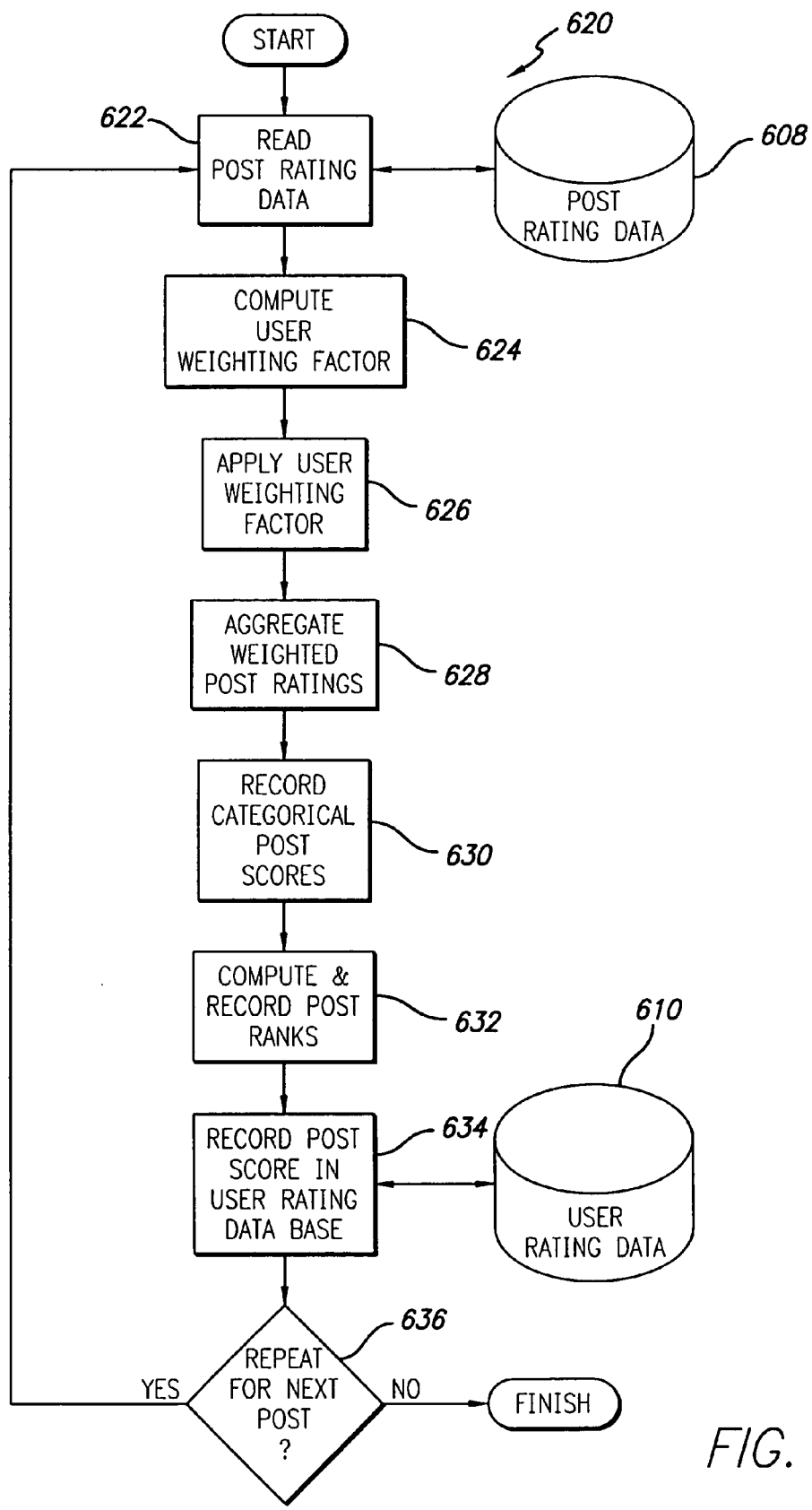
FIG. 6C is a flow chart illustrating further details of a method for providing users an option to individually rate information posts stored in a Webroom memory.

At step 604, users are provided an option to individually rate each post viewed. An exemplary Web page showing features for providing users this option is shown in FIG. 6B. Webroom post page 650 contains a display of at least one post 676. Adjacent to each post 676, a respond button 658 and one or more voting objects 660 are displayed. Webroom page 650 additionally includes a subject line 652, a general post button 654, a scrolling object 656, and a tolerance bar 670, which is discussed in more detail later in the specification in connection with FIGS. 13A and 13B. Users may scroll through the postings by using scroll objects 656, may post a response to any particular posting using a respond button 654, and may submit a general posting (not in response to any particular posting) using post button 654. Score display bar 672 provides users an option to receive rating data. Scores may be displayed directly on bar 672, which preferably is programmed to provide additional rating data when selected by a user, for example, when double-clicked on.

Vote objects 660 provide users an option to rate posts according to at least one predetermined criteria. Several different rating criteria (also called categories), for example, spam, flame, and relevance are preferably used. Various formats of vote objects may be provided. For example, a voting bar comprised of a decrease button 664, a score field 666, and an increase button 668 may be provided. In this case, a user can rate each post by increasing or decreasing the score in the score field using the increase button 668 and the decrease button 664, or by entering a score directly in score field 666. Voting objects may be tailored for the intended Webroom user community, for example, more sophisticated voting objects and rating schemes may be presented in an academically-oriented Webroom, as opposed to a Webroom for young children.

Whatever specific rating scheme is used, the scheme is preferably designed to be fun and easy to use, while at the same time collecting information about each post that is as accurate and complete as required to reliably reflect the information value of posts with respect to each designated Webroom topic. To accommodate scoring and ranking of posts, it is preferable for at least a portion of rating data received from users to comprise a quantitative rating. For example, a numeric ranking of relevance between zero and ten, with ten indicating the highest possible relevance, and zero indicating no relevance whatsoever, is an example of a quantitative rating. Additionally, an alphabetic rating system, such as grading from "A" to "F," is also a quantitative rating system, because each letter grade can be readily assigned a numeric value. In addition to spam, flame, and relevance categories, scoring categories may include credibility, accuracy, clarity, wit, or any category of interest to the user community. An overly complex scoring system will tend to discourage use, so the scoring system should be limited to scoring categories of interest to each particular Webroom user community. It is anticipated that the categories of spam, flame, and relevance will be of interest to most Webroom users. Furthermore, at least one relevance category is needed for developing a relevance scoring and ranking system that promotes topical organization and self-evolution as described above.

In order to prevent misuse of the rating system, it is preferable to limit the number of times a user may rate any particular post. Preferably, each user may only rate each post a maximum of once, and no user may rate his or her own posts. Additional limitations may be placed on rating. For example, each user may be limited to a predetermined number of votes per Webroom within a given time period. Such limits may be based on a user ranking, for example, users identified as providing only spam could be prevented from rating any posts, and highly ranked users could be rewarded with additional rating privileges. Basing rating rights on user status has the advantage of providing more control over the Webroom content to the most interested and knowledgeable users, thus facilitating growth and organization of higher-quality information.

Each post 676 in Webroom page 650 preferably includes a private e-mail button 674. E-mail button 674 provides a convenient way for users to send e-mail directly to authors of posts, without requiring the authors to make their e-mail address public. Using the private e-mail button 674 and associated method, communication between members of the forum is enabled, while "harvesting" of e-mails by others (such as would-be "spammers") is prevented. Preferably, the only way to contact the member using the Webroom page 650 is by selecting the e-mail button 674 from within a post authored by the intended recipient, thus preventing mass mailings such as are typically used for unwanted commercial solicitations. When a user selects e-mail button 674, an e-mail message authoring window (not shown) as known in the art is provided to the user. After completing the message to the selected author, the user sends the message to the Webroom server. The server then forwards the message to the post author by referencing a database of private e-mail addresses provided by the forum members.

Referring again to FIG. 6A, if a user elects to provide rating data for a particular post at step 604, then the rating data provided by the user is recorded in post rating database 608, and indirectly in user-associated rating database 610. Before recording the data in user database 610, the rating data is preferably processed according to a process illustrated in more detail by FIG. 6C. The process 620 shown in FIG. 6C may be initiated at any time, that is, it may be performed synchronously or asynchronously with the posting process. Process 620 is preferably repeated continuously to process new rating data as it is added to the system. Process 620 preferable executes in the system background without interrupting user actions, such as searching, receiving, or rating posts. It should be noted that steps 624-632 of process 620 all require access to post rating database 608. The details of process 620 will vary depending on variations in the desired output and the data structure used for post rating data.

Figure 6D:
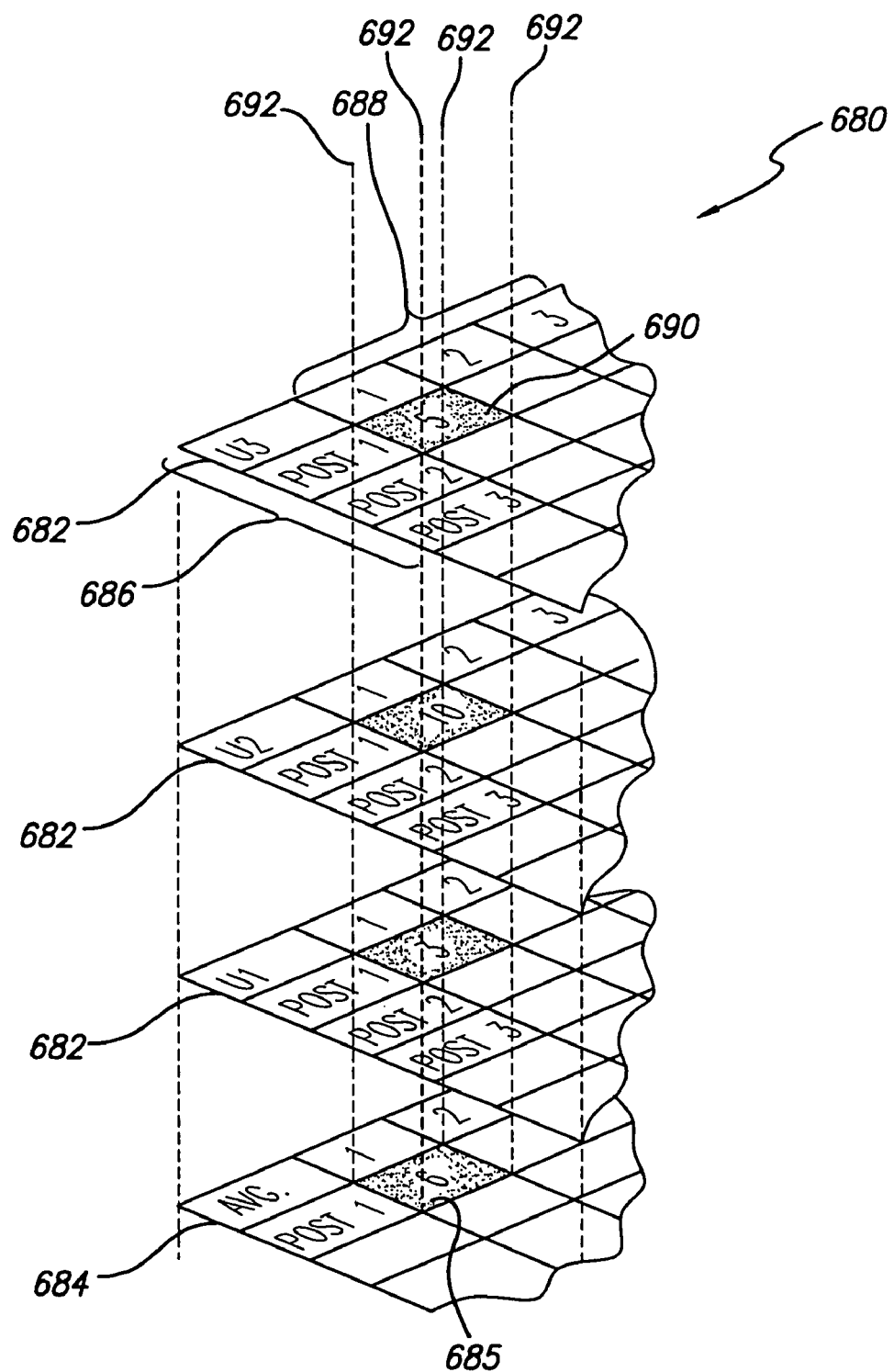
FIG. 6D is an illustration of a data structure for rating data received from Webroom users.
Figures 7, 8:
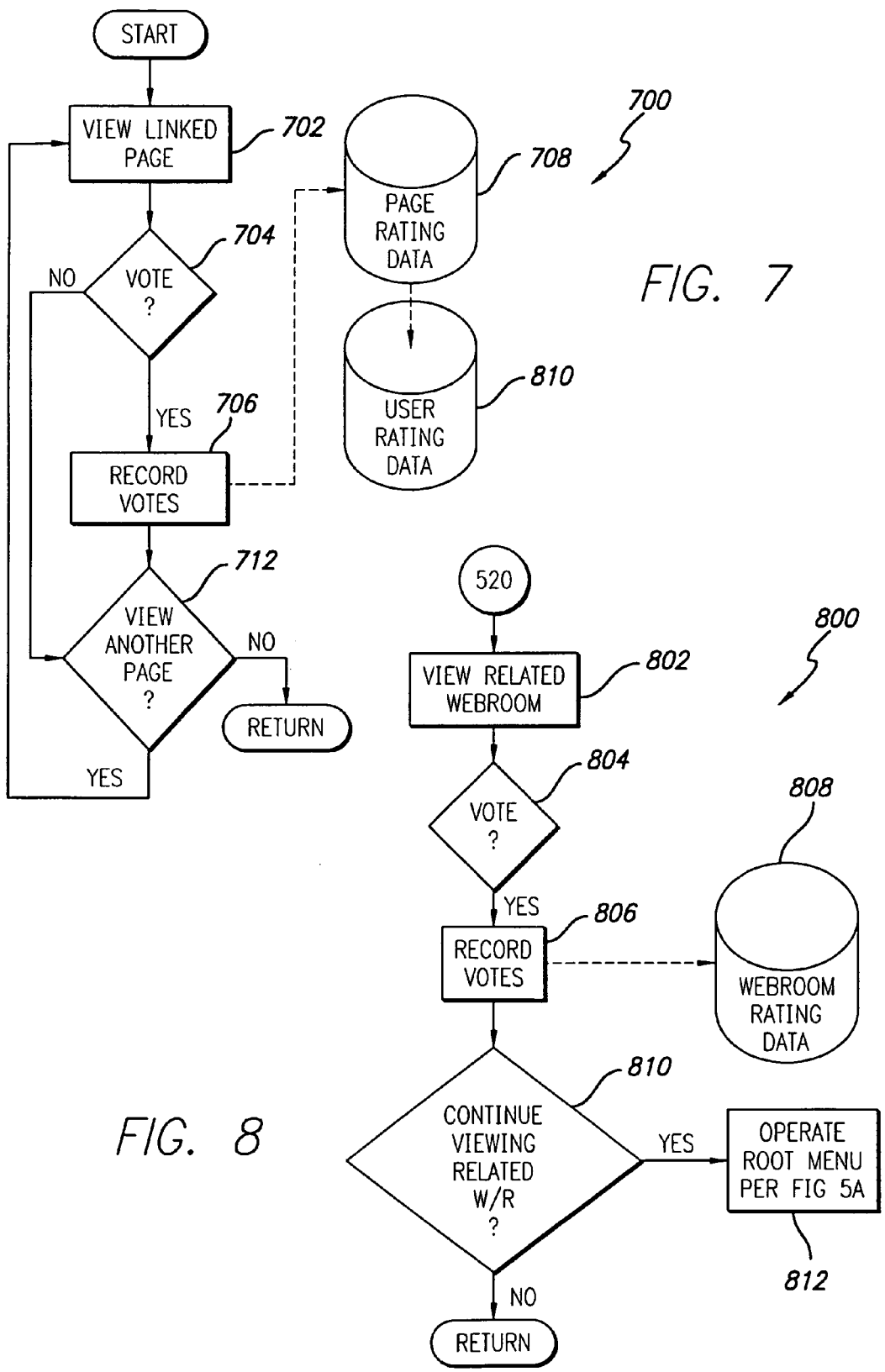
FIG. 7 is a flow chart illustrating a method for providing users an option to rate related Web pages for which links are on a Webroom page menu.
FIG. 8 is a flow chart illustrating a method for providing users an option to rate a related Webroom pages for which links are on a Webroom page menu.

An exemplary data structure for post rating data is illustrated in FIG. 6D. Data structure 680 is preferably realized in a relational database organized according to a database standard, for example SQL. Any number of user levels 682 are present, with each user level having any number of rows 686 and columns 688. It should be noted that the terms "level," "row," and "column" represent dimensions that are not topographically distinct in the context of a relational database. A data structure according to the present invention is, of course, not a physical structure, and may have any number of dimensions. The illustration of three dimensions in FIG. 6D is for simplicity of explanation. In the example illustrated, each row 686 represents rating data for a particular posting, for example, post 1, post 2, etc. Each column 688 represents rating data in a particular category, for example, category 1, category 2, etc. Each level 682 represents rating data contributed by a particular user, for example, user 1, user 2, etc. Level 684 represents an aggregate of rating data from multiple users. An aggregate is any statistical measure that reflects the overall value of a set of quantitative ratings, such as a sum, a weighted average, a simple average, a rolling average, a median value, or similar measure. Each cell, for example, cell 690, is defined by a row-column intersection on a particular layer. Each layer contains corresponding cells, as indicated by the dashed vertical lines 692. For example, cell 685 of level 684 contains an average of rating data contained in the cells defined by the intersection of row 1, column 1, on all user levels 682, and indicates a simple average of the user ratings for post 1, category 1.

One skilled in the art will recognize that a wide variety of aggregate statistical data may be developed across and within levels of the data structure for use in the process 620. Referring again to FIG. 6C, at step 622, the post rating data is read from post rating database 608 to begin the process.

In an alternative embodiment, to account for variability between users' rating tendencies (for example, some users will tend to assign scores that are consistently higher or lower, on an aggregate basis, than other users in any given category), a step 624 of computing a relative weighting factor for each user is performed, to be applied to the user data provided by that user. For example, user weighting data for each user may be developed by aggregating columns on each user level 682 shown in FIG. 6D. To reduce system load, user weighting factors may be computed less often than post rating and scoring data; for example, step 624 may be performed periodically, such as once per day, and during off-peak hours. At step 626, the computed user weighting factors are applied to the user rating data, for example, by performing a matrix multiplication or other transformation operation on the rating data, to obtain weighted rating data. At step 628, the weighted data ratings are aggregated for each category of rating and each posting to obtain a post score in each category, which is recorded in the rating database 608 at step 630. One skilled in the art will recognize a variety of other weighting schemes designed to correct for variability among rating agents, which may be usefully employed to operate on user data within the scope of the present invention. One skilled in the art will further recognize that steps 624 and 626 may be omitted entirely, to provide single-vote-per-user, single-unit-per-vote rating, which provides the advantages of simplicity and ease of implementation.

The post scores are used to compute and record a post rank at step 632. A post rank measures the posts' relative scores with respect to other posts in the Webroom. It is anticipated that as the number of posts in a Webroom grows, a higher score will be required to maintain a given ranking. Additionally, it is preferable to time-stamp rating data and discount older data in the ranking scheme. Thus, older posts must continue to be viewed and rated in order to maintain their ranking relative to newer posts. Posts that fail to achieve pre-established minimum rankings, i.e., a "community standard" for posts, may be removed from the Webroom. Community standards for posts may be established by default at the time of Webroom founding, and may be modified as desired by users or a system administrator. However, setting standards too high will tend to cause posts of interest to some users to become unavailable. Thus, it is preferable that standards for posts be kept relatively low. Users not wishing to view lower-ranked posts may filter them out using a user preference process as described elsewhere in the specification.

As previously discussed, maintaining an accurate ranking for posts can provide an important impetus for evolution towards more highly organized Webroom systems, by organizing the best information closest to each identified topic. Both post ranks and post scores may be associated with each post, and made available to users by a variety of selection methods. For example, one method enables searching posts by keyword and rank (or score), so a user could search for, for further example, the posts containing the word "Jersey cows," having a relevance score greater than five and a spam score less than two. By searching among higher-ranked posts only, i.e., by setting user preferences to filter out lower-ranked posts, a user may selectively reject posts that do not meet the user's threshold criteria. Another method is to display posts according to rank within a Webroom, as discussed above. However, displaying posts in a ranked order, or omitting lower-ranked posts from a display, has the disadvantage of disrupting the chronological or threaded display schemes described above. Disruptive effects may be reduced by using a placeholder, which indicates the presence of an omitted item, as previously described. In the alternative, the ranked post ordering is presented in an alternative display that may be selected by activating a user command, such as a toggle button. Still another method, which avoids the disadvantage of disrupting chronological or threaded displays, is to display scores adjacent to each posting, as done with the score display bar 672 discussed previously.

At step 634, each post for which a score has been newly computed during process 620 has its new score recorded in a database 610 of user-associated rating data. A data structure similar to data structure 680 may be used for user-associated rating data, in that a level for each user may be defined, having columns corresponding to categories, and rows corresponding to posts. The principal difference resides in the cell content. In the user-associated rating data structure, each cell contains an aggregate score of the posts contributed by the particular user, instead of a user-provided rating of another user's post, as previously described. In other words, rating data is associated with each contributing user. For example, a record for a user who had contributed three posts would contain the rated post scores for the user's three posts, as developed from rating data contributed by other users. Each score is recorded in a record for the contributing user, preferably superceding any prior aggregate scores recorded for the same post and user. The user rating scores may be aggregated in a similar manner to post rating data, for developing a user score. The users may be ranked like posts, based on relative scores, principally for providing an incentive to users to contribute high-quality posts. As indicated at step 636, process 620 may be repeated for each unscored post until finished.

Having thus described a process for receiving rating data pertaining to selected posts, the description of user interaction with Webroom posts is continued. Returning to FIG. 6A, if the user does not elect to provide rating data at step 604, the user is provided an option to post a response at step 612. If the user elects to post a response, for example, by activating a response object 658, then at step 614, the response is received and recorded in database 616 containing post data. It is preferable to automatically refresh the user's Webroom page after storing the post, so the user may view it on Webroom page 650. If the user does not elect to post a response, and after completing a response, the user is provided the option of continuing to receive and review posts at step 618. If the user elects to continue, the process may be repeated any number of times, beginning with step 602. If the user is finished viewing the postings, the user is returned to the root menu page 570.

Returning to FIG. 5A, a second option on the root menu page 570 comprises an option 508 to select and rate links to related Web pages from a list of Web pages (toplist) provided on the root menu page 570. Selecting a link to a related web page initiates a process 700 for viewing and rating related Web pages. Related Web pages add an important component to the topical information presented by each Webroom. Furthermore, links to a Webroom page on related Web pages provide for increased traffic to the Webroom, that compensates for the links to the related Web pages provided by the Webroom. Thus, the toplinks provide for a mutually beneficial and cooperative relationship between Webroom pages and other information resources on the network. In general, tracking incoming traffic from a related page, or a potentially related page, is important for creating and maintaining toplists, because traffic exchange and cross-promotion is central to this mutually beneficial relationship.

Process 700 begins at step 702, when the requested related Web page is delivered to and reviewed by the user. In an embodiment of the invention, if the related Web page is not reached using an existing link on a toplist, the address of the page is noted in a Webroom database, and a count of incoming traffic from the page is initiated. In an alternative embodiment, page requests for potentially related pages are also counted. Additionally, users may be provided with an option to nominate other Web pages for inclusion in the toplist, similarly causing the address of the page to be stored and page requests to be tracked. Pages receiving a sufficiently high number of requests may be promoted to the toplist, and conversely, pages with too little activity may be removed from the toplist.

At step 704, the user is provided an option to rate the Web page. Preferably, the related Web page is presented in a frame of the Webroom page, so that the option to rate the related Web can readily be provided in an adjacent frame of the Webroom page. In the alternative, the user may elect to rate a related Web page by selecting a link on the toplist in conjunction with a "vote" or "rate" command selected using a menu or other selectable object.

At step 706, the page rating data from the reviewing user is received and stored in a database 708 of page rating data. If the Web page is provided by a Webroom user, for example, a founder, the rating data is also stored in the database of user-associated rating data 610, similarly to the process described above with respect to post rating data. In many respects, rating a Web page is similar to rating a user post, the principal difference (for rating purposes) being that related Web pages may contain links back to the Webroom page. Also, different or additional rating categories may be appropriate, for example, the criteria of "spam" and "flame" are less appropriate for a Web page, whereas other categories, such as response time or page organization, may be of more interest to users. Of particular importance to rating Web pages are traffic data, such as the number of times the Webroom page is requested from the related Web page (incoming traffic), and the number of times a page is requested from a Webroom page (outgoing traffic). In particular, users who create related Web pages that refer a relatively large amount of traffic to the Webroom are preferably recognized and rewarded (for example, by designating the related Web page as a toplink) based on comparative ranking of traffic data. Furthermore, the higher the number of page requests, the more likely it is that the related page contains relevant or useful information, thus making outgoing traffic worthy of consideration also. However, at present, implementation of outgoing traffic tracking requires a more involved technical scheme than tracking incoming traffic, and is therefore omitted in some embodiments. One skilled in the art will recognize that the process 620 for receiving and analyzing rating data for posts may be adapted for related Web pages rating data without great difficulty. Further details concerning rating related Web pages, and using rating data, are provided below in connection with FIGS. 11A-C.

At step 712, the user is presented with an option to receive another related Web page. If the user selects the option, process 700 is repeated, beginning at step 702. If the user declines to receive another page, the user is returned to the root menu page 570, as exemplified by process 500 of FIG. 5A. A third option on the root menu page 570 comprises an option 510 to select and rate links to related Webroom pages from a list of Webroom pages provided on the root menu page 570. Selecting a link to a related Webroom page initiates a process 800 for viewing and rating related Webroom pages. Providing links to related Webroom pages is one of the essential features for providing a system of related topically organized, self-evolving information exchange groups, as discussed above. To promote a high level of organization, links to the most closely related Webroom pages are continually established and maintained, and links to Webroom pages that are not as closely related are continually deleted. Similarly to related Web pages, user rating and use data, as received from a process such as process 800, is the primary basis for the establishment and maintenance of links to related Webrooms.

Process 800 begins at step 802, when the requested related Webroom page is delivered to and reviewed by the user. If the related Webroom page is not reached using an existing link on the referring Webroom page, the topical cross link is preferably noted in a Webroom database and a count of cross link use is initiated. This may be accomplished using a nominating button as described previously, or otherwise providing users an option to link to Webroom pages that are not on a current list of links, for example, through a Webroom search process. Webroom pages receiving a sufficiently high number of requests are promoted to a list on the referring page, and conversely, cross links with too little activity are removed from the referring page. At step 804, the user is provided an option to rate the Webroom page, which may be accomplished as discussed above with respect to rating related Web pages.

At step 806, the Webroom rating data from the user is received and stored in a database 808 of page rating data. In virtually all respects, rating a Webroom page is similar to rating a related Web page, the principal difference (for rating purposes) being that different or additional rating categories may be appropriate for related Webroom pages. For example, the criteria of response time or page organization are less appropriate for Webrooms, which are typically delivered from the same or related servers as the referring Webroom, and are organized in a standardized fashion. One skilled in the art will recognize that, similarly to related Web pages, the process 620 for receiving and analyzing rating data for posts may be adapted for Webroom data without great difficulty. Further details concerning rating Webrooms, and using rating data, are provided below in connection with FIGS. 12A-C.

At step 810, the user is presented with an option to continue viewing the related Webroom page (which is likely to contain a link back to the referring Webroom). If the user elects to continue viewing the Webroom, at step 812, a process 500 of root menu operation, as illustrated in FIG. 5A, is initiated. However, if the user is already registered, login process 550 is preferably abbreviated by automatically registering the user in the new Webroom, and accepting the original login (unless a special security consideration applies to the new Webroom). If the user decides to return to the referring Webroom, the user is returned to the root menu page 570, as exemplified by process 500 of FIG. 5A. Thus, a user may preferably freely surf between Webrooms, as if perusing different topics within a single Webroom. In effect, a system organized in this manner operates as if it were a single Webroom with multiple topics.

Returning to FIG. 5A, the root menu contains an exit option 512, which may be exercised by linking to another site, or by inactivity for a proscribed period of time. However, the root menu is preferably always available, and the chief consequence of exiting is triggering a requirement to repeat the login process 550 when access to the Webroom is again desired by the user.

Figure 9:
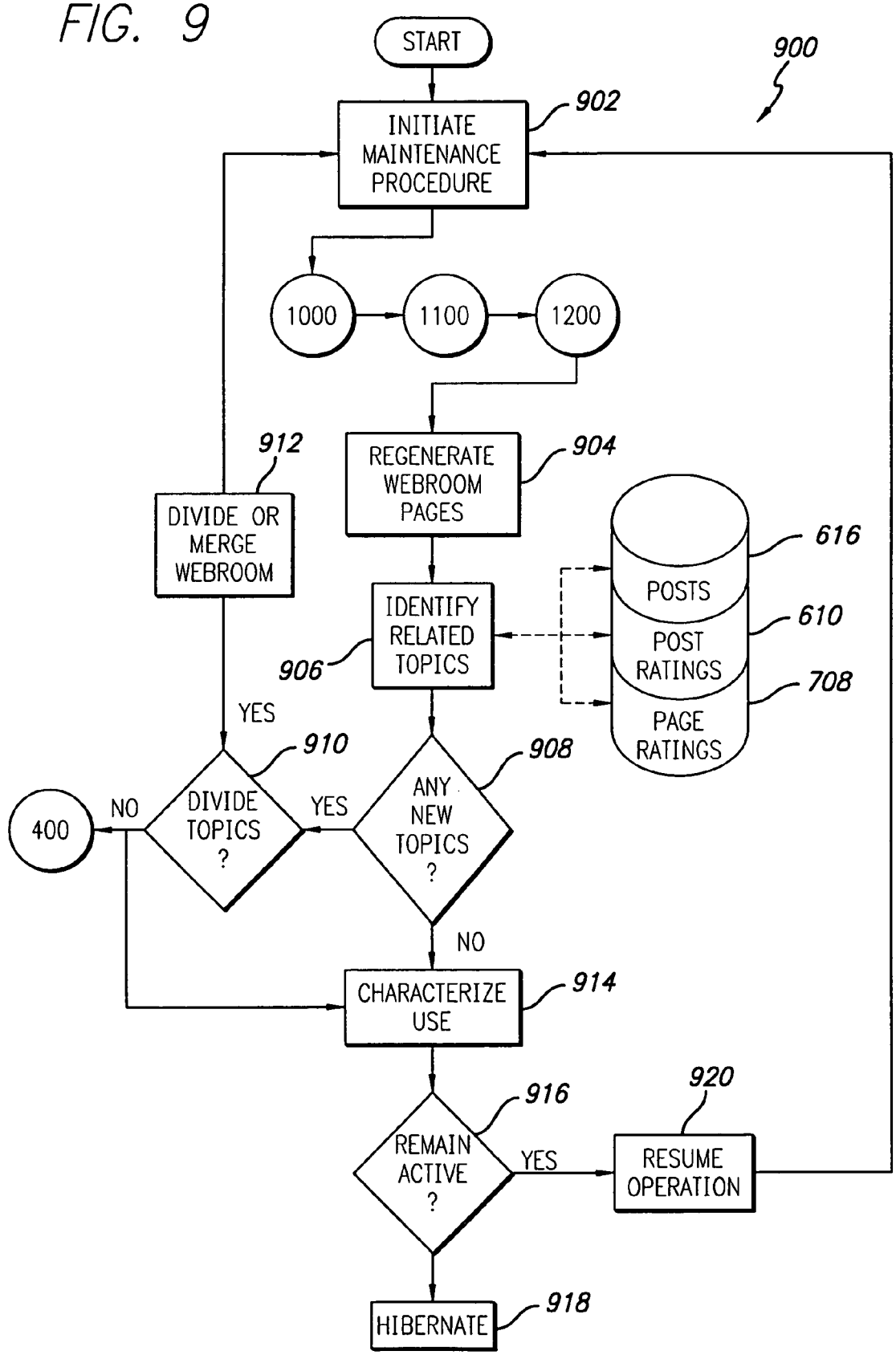
FIG. 9 is a flow chart illustrating a method of performing Webroom maintenance.

Periodically, maintenance process 900 is preferably performed, as illustrated in FIG. 9. Regular performance of process 900 on each Webroom of a system of Webrooms operated and used as described above will result in self-evolution of the system to a higher level of topical organization. Process 900 is preferably executed as a background operation. Like maintenance procedures generally, it is preferable to execute process 900 when the demand on system resources is otherwise low, as during off-peak hours. At step 902, the process is initiated by a timer or other system parameter set to indicate an appropriate time for performing the process 900. Initially, the subroutines 1000, 1100, and 1200, diagrammed in more detail in FIGS. 10A, 11A, and 12A, respectively, are run in sequence.

Figures 10A, 10B:
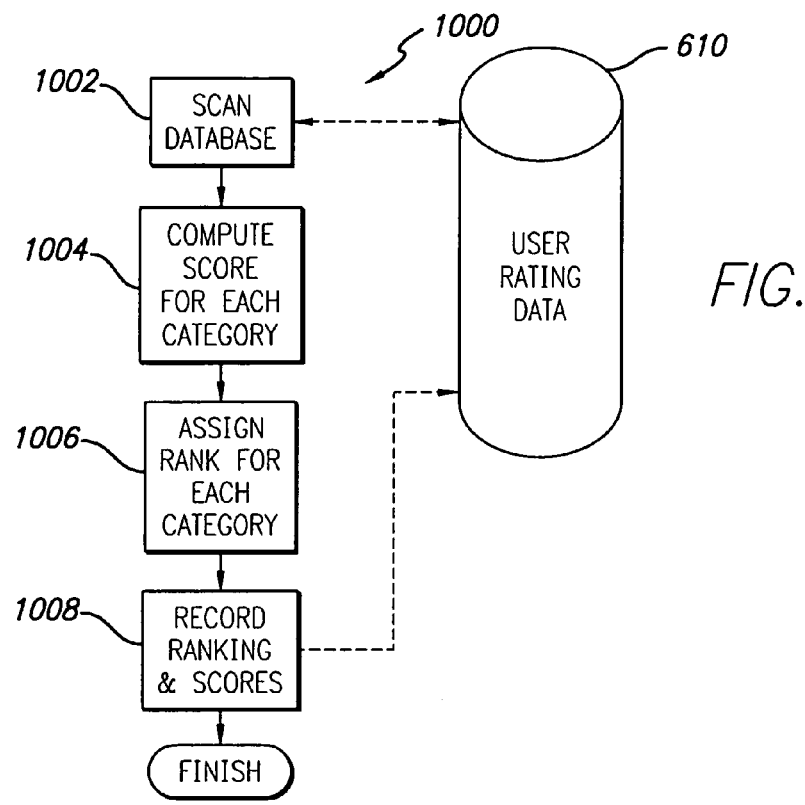
FIG. 10A is a flow chart illustrating a method for rating and ranking users of Webrooms.
FIG. 10B is an illustration of a data table containing exemplary user rating data.

Referring to FIG. 10A, subroutine 1000 comprises a process for ranking users. As previously described in connection with step 634 of process 620, each Webroom preferably has a database of user associated rating data 610. Database 610 preferably comprises an aggregate score for each post contributed by the user. At step 1002, rating information is obtained from database 610. At step 1004, each user's aggregate score for each category is computed. For example, if in any given rating category, such as relevance, the user's ten posts had each been rated ten times, an aggregate value, such as an average, would be computed for the one-hundred ratings (also called votes) received. Other statistical measures, such as a median value and a standard deviation, may also be computed at step 1004. A rolling average may be useful for tracking changes in the user's performance over time. One skilled in the art will recognize that various other statistical measures may be computed, depending on the parameter to be measured. For example, statistical measures may be employed to detect aberrations in rating data that may indicate misuse of the voting process, or other data errors. For the purpose of promoting topical organization, aggregate scores that fairly reflect the value of ratings received by each user, and user activity, are preferred. Thus, it is preferable to identify and disregard aberrant data using statistical tools as known in the art.

At step 1006, the users are preferably ranked according to their scores in each category and according to their activity (for example, the number of posts contributed). Preferably, an overall ranking is determined. Additionally, a ranking in one or more rating or activity categories may be determined. For example, users may be separately ranked according to their scores in a relevance category, or according to the number of posts contributed. Ranking may be continuous, for example, in a group of one-hundred users, assigning everyone a unique number between one and one-hundred; or discrete, grouping closely-ranked users into discrete ranking levels; or any combination of discrete and continuous ranking may be used. Also, rating and activity information may be combined across categories to classify users into different types and levels. Whatever ranking system is used, it should be designed to facilitate the central purpose of motivating users to provide high-quality information. Thus, desirable behavior should be recognized with high ratings, and undesirable behavior with low ratings. Preferably, users with favorable ratings are rewarded with privileges, such as additional or enhanced voting privileges, the right to designate one or more toplinks of their choice, public recognition on Webroom pages, and other rights or recognition tending to increase desirable users' influence on Webroom content and traffic direction. Incentives such as prizes of merchandise or cash may also be awarded, if desired. Conversely, extremely negative scores (such as high spam scores) should be discouraged by imposing restrictions on access and use of the Webroom.

At step 1008, the user ranking and scores are recorded in database 610. A table 1020 exemplary of ranking and scoring data that may be recorded is provided in FIG. 10B. Table 1020 comprises rows 1022 and columns 1024. Each row of rows 1022, for example, rows 1031-1034, is assigned to a unique user. Each column, for example, columns 1041-1050, is assigned to a rating or activity category. It should be noted that table 1020 contains a section of columns (e.g., columns 1041-1050) for data pertaining to a particular first Webroom, and another section of columns (not shown) for general user data, such as the user name and e-mail address. A different table 1020 containing unique rating data may be generated for different Webrooms, reflecting that a user is rated differently in different Webrooms. Exemplary data is provided in each cell of the table 1020 to illustrate how different rating and activity information may be used to classify users.

For example, column 1041 contains a count of the posts contributed by each user, and column 1042 contains the average post length in words. Columns 1043 through 1046 contain each user's aggregate score in the respective categories of flame, spam, relevance, and accuracy. Column 1047 contains a count of the number of votes received, that is, the number of times the user's posts have been rated by other users. Column 1048 contains a count of the number of times each user has requested posts from the server. Column 1049 contains the number of linked Web pages relating to the Webroom topic that each user has provided. Column 1050 contains a classification, or rank, assigned to each user on the basis of other information in the table. A comparison of the users is made using the exemplary data. Row 1031 pertains to USER1, showing relatively moderate levels of activity and ratings as compared to the other users. Accordingly, USER1 is assigned a status of "Active Member." Data for USER2 is shown on row 1032. USER2 has relatively few lengthier posts, which are highly rated for accuracy and relevance, and which have received a proportionally high number of votes. USER2 also has fifty linked Web pages. Thus, USER2 is assigned a status of "Expert." In contrast, data for USER3 in row 1033 clearly indicates a large number of spam postings with no rated relevance, so USER3 is assigned a status of "Spammer." Such a status preferably will result on restrictions on USER3, for example, USER3 may be prevented from submitting or rating posts. Data for USER4, in row 1034, indicates post viewing activity with no contribution of posts, so USER4 is assigned a status of "Lurker." One skilled in the art will recognize from the foregoing example that a wide variety of rating and activity data may be recorded, and used to classify and rank users in numerous ways, without departing from the scope of the invention.

Figure 10C:
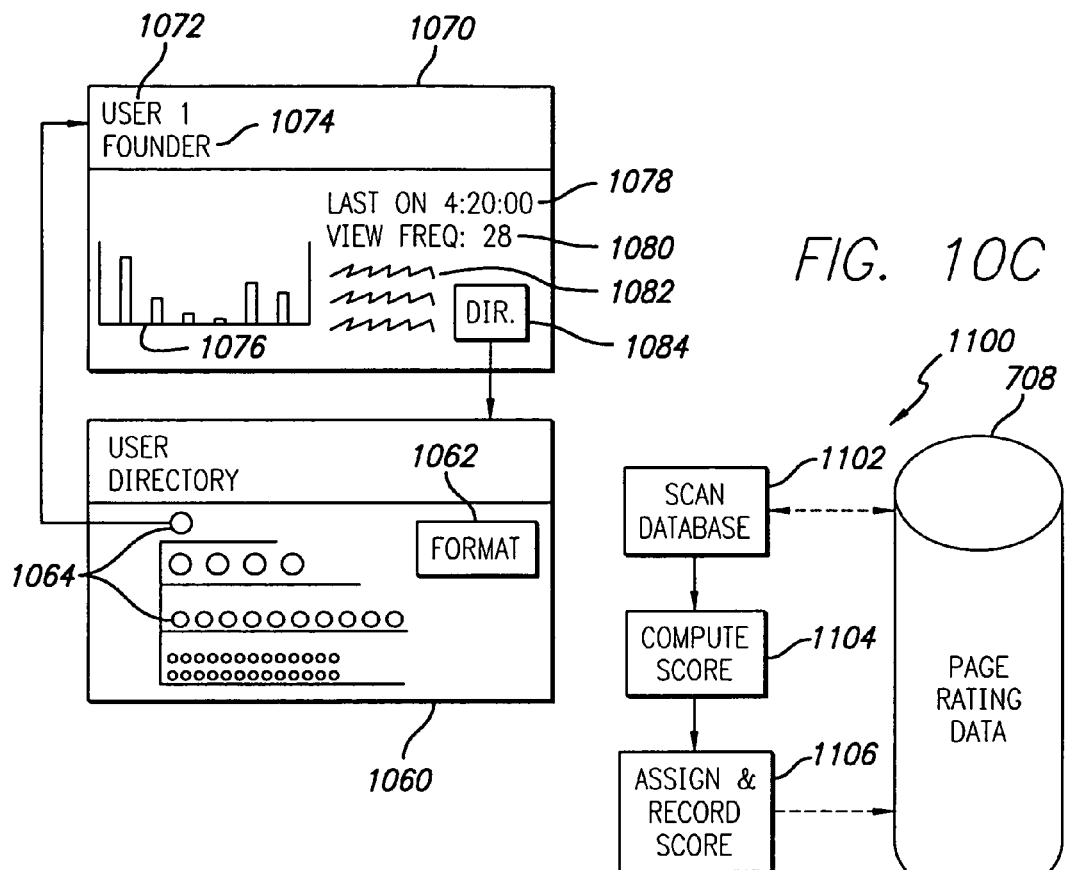
FIG. 10C is an illustration of an exemplary display of user rating information on a Web page.

Preferably, selected user ranking information may be viewed by Webroom users. For example, a user directory page 1060 may be provided, as illustrated in FIG. 10C, preferably accessed from a link on root menu page 570. User directory 1060 is preferably available in a variety of formats, for example, in alphabetical order, or according to user classification or rank in various rating categories, which may be selected using format button 1062. In FIG. 10C, a format showing users classified in discrete levels is shown. Each user is represented by an object 1064 on directory 1062. Each object 1064 preferably comprises a hyperlink. Preferably, by selecting any object 1064, a user may access a detailed user information page 1070. Information page 1070 contains the user name 1072 and user status 1074. Additional information may include a graph 1076 or other presentation of user activity and rating information, specific activity information, such as last date of use 1078 and average use level 1080. Users are preferably provided an option to submit information 1082 of a biographical nature for display on information page 1070. Page 1070 is preferably provided with a directory button 1084 for accessing the user directory page 1060.

The presence of user rating data lends itself to various possibilities. In one embodiment of the instant invention, the Webrooms contain a setting allowing members to be exiled based, in part, upon their user rating information. That is, in the event that a user's rating falls below certain pre-established "community standards" for users, the user's access and use rights to the Webroom are restricted, up to and including termination of all access rights. Community standards are established by a founding user, or in the alternative, determined by all users, or a selected portion of the users, such as higher-ranking users. In another alternative embodiment, no community standards are set, but each user sets personal standards using preference information as discussed below in connection with FIGS. 13A and 13B. Using personal preference information, members may in effect be exiled by individual users, for those users only, such that no posts made by the exiled member will be displayed to the self-selected users. It should be understood that members can be exiled, or have their rights partially restricted, from individual Webrooms or across groups of Webrooms (or groups of related Webrooms) or from all Webrooms, depending on system settings. In the usual case, however, users are rated, ranked, and if necessary, restricted with respect to particular Webrooms only.

Figure 11A:
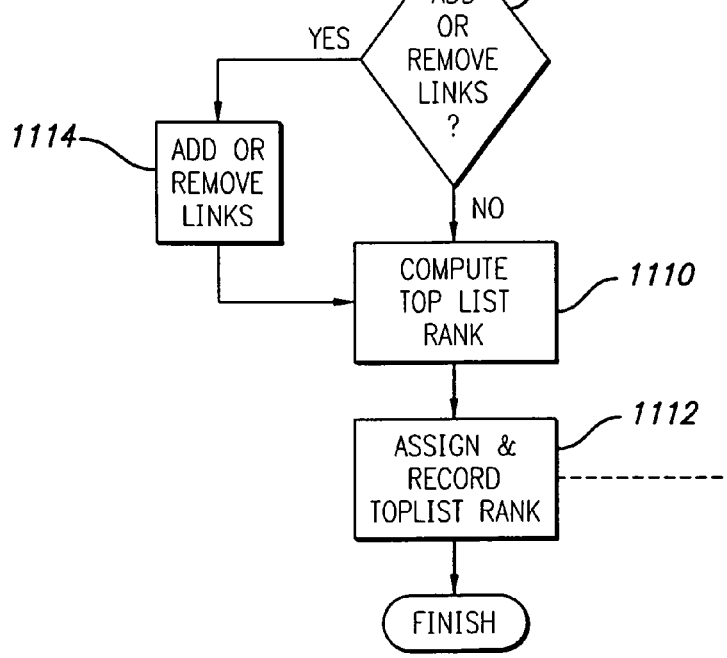
FIG. 11A is a flow chart illustrating a method for ranking related Web pages for which links are on a Webroom page menu.

In addition to process 1000 for ranking users, maintenance process 900 preferably includes a process 1100 for ranking toplinks, illustrated in FIG. 11A. As previously described in connection with step 706 of process 700, each Webroom preferably has a database of related Web page rating data 708. Database 708 preferably comprises rating and activity information for each linked Web page, and for Web pages that are not on the toplist but are otherwise identified as prospective Webrooms for placing there. At step 1102, rating and activity information is obtained from database 708. At step 1104, an aggregate score is computed for each rating and activity category. As discussed in connection with process 1000, aggregate scores may be derived using a variety of different statistical measures.

At step 1106, the Web pages are assigned a score in each rating and activity category. At steps 1108 and 1114, Web pages that fail to achieve a predetermined minimum score in one or more categories are identified and their links are removed from the toplist. Also at steps 1108 and 1114, Web pages that have newly achieved a predetermined minimum score are added to the toplist. At step 1110, the links in the toplist are ranked. Preferably, an overall (or default) ranking is determined for the toplist. Additionally, a ranking in one or more rating or activity categories may be determined for providing users an option to view alternative rankings. For example, Web pages may be separately ranked according to their scores in a relevance category, or according to the number of times the page is linked to from the Webroom, i.e., according to their popularity. Ranking is preferably continuous, that is, toplinks are preferably ranked in a sequence. Whatever ranking system is used, it should be designed to promote a central purpose of identifying the best incoming traffic generators, and the most closely related and useful Websites. Pages that fail to meet minimum standards, which may vary depending on the quality of other pages on the toplist, are removed from the toplist.

Pages that are removed from the toplist may be retained on a list of nominated related pages, according to an embodiment of the invention. Pages on a nominated list may be similarly scored and ranked as pages on the toplist. Pages on a nominated list that achieve a sufficiently high score may be promoted to the toplist. Pages with a score below a minimum standard for the nominated list may be periodically removed from the nominated list. One skilled in the art will recognize that, although two levels of lists (a toplist and a nominated list) have been described, any number of levels of lists may be implemented according to the methods of the present invention. Furthermore, separate lists may be maintained in different categories, for example, "best reference information," "humorous links," and so forth.

At step 1112, the page rank and scores are recorded in database 708. A table 1120 exemplary of ranking and scoring data that may be recorded is provided in FIG. 11B. Table 1120 comprises rows 1122 and columns 1124. Each row of rows 1122, for example, rows 1131-1132, is assigned to a unique page. Each column, for example, columns 1141-1151, is assigned to a rating or activity category. It should be noted that table 1120 contains a section of columns (e.g., columns 1141-1149) for data pertaining to a particular first Webroom, and another section of columns (e.g., column 1150) for general page data, such as the user associated with the page, page size, and so forth. Each Webroom has its own table 1120 containing data unique to the Webroom, reflecting that pages are rated differently with respect to different Webrooms. Exemplary data is provided in each cell of the table 1120 to illustrate how different rating and activity information may be used to classify pages.

For example, column 1141 contains a count of the number of times the Webroom has been accessed from a link (if present) on the related Web page, and column 1142 contains a count of the number of votes received, that is, the number of times the page has been rated by users. Columns 1143 through 1147 contain each page's aggregate score in the respective categories of relevance, accuracy, ease of use, server responsiveness, and fun. Column 1148 contains a classification assigned to each page on the basis of other information in the table. Column 1149 contains the page rank relative to other pages in the same classification. Column 1150 contain the identity of a Webroom user who owns the page, if there is any such user for the page. A comparison of the pages is made using the exemplary data. Row 1131 pertains to PAGE1, showing relatively moderate levels of activity, high relevance, accuracy, ease of use, and responsiveness ratings, and a relatively low fun rating as compared to the other pages. Accordingly, PAGE1 is assigned a status of "Expert Page." Data for PAGE2 is shown on row 1132. PAGE2 has a relatively high level of activity, and good relevance, ease of use, and responsiveness scores, while not being rated for accuracy. PAGE2 also has a relatively high fun rating. Thus, PAGE2 is assigned a status of "Fun Page." One skilled in the art will recognize from the foregoing example that a wide variety of rating and activity data may be recorded, and used to classify and rank pages in numerous ways, without departing from the scope of the invention.

Figures 11B, 11C:
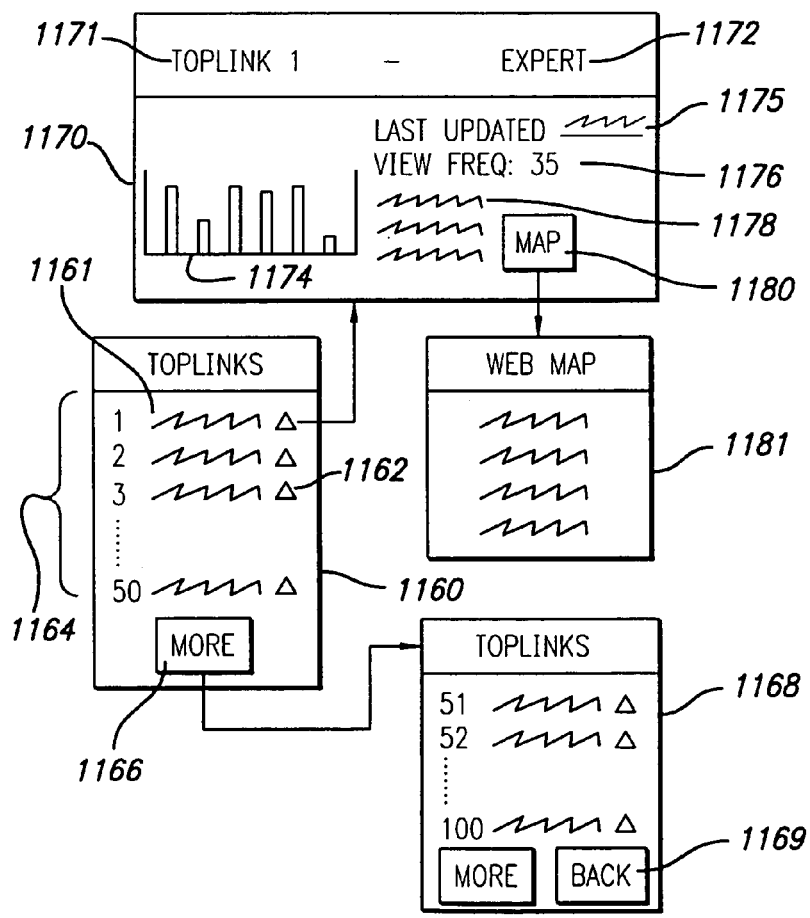
FIG. 11B is an illustration of a data table containing exemplary Web page rating and ranking data.
FIG. 11C is an illustration of an exemplary display of Web page rating and ranking information on a Web page.

Preferably, selected toplink ranking information may be viewed by Webroom users. For example, toplink menu 1160 is preferably provided on root menu page 570, as illustrated in FIG. 11C. Menu 1160 preferably contains a list 1164 of toplinks in a ranked order. Each toplink in the list comprises a hyperlink 1161 to its related Web page (or Web site), and is preferably provided with a hyperlink 1162 to a toplink information page 1170. Each toplink may additionally be provided with a way to vote on the linked Web site, such as a vote button (not shown) similar to those used for voting on posts. Information page 1170 is preferably provided, with graph 1174 or other presentation of page activity and rating information, specific activity information, such as last revision date 1175 and average use level 1176. A brief summary 1178 of page content is also provided. Additionally, page 1170 preferably includes a hyperlink 1180 to a Web map page 1181. A Web map is a page for mapping a Web page or web site, as described in the U.S. patent application Ser. No. 09/549,505, now U.S. Pat. No. 7,546,530, "METHOD AND SYSTEM FOR MAPPING A SITE ON A WIDE AREA NETWORK," filed Apr. 14, 2000, which application is specifically incorporated herein, in its entirety, by reference. Toplink menu 1160 additionally includes more button 1166 for scrolling forward through the toplink list, and a back button 1169 on applicable displays 1168 of the toplist, for scrolling backwards. In an embodiment of the invention, a different toplink menu 1160 is provided for different, categorized lists of links; for example, a list of "expert" links and a list of "fun" links. Additionally, lists of nominated links are preferably provided in a format similar to the toplink menu 1160.

Lists of links, such as toplist 1160, may be displayed in a variety of ways, but are preferably accessible through a pull-down or pop-up menu on a home frame of the Webroom page. This format of display removes the lists from the display when they are not wanted, while at the same time allowing for ready viewing and accessing of the links. One skilled in the art will recognize that the functions described above may be implemented in a wide variety of graphical formats, without departing from the scope of the invention.

Figure 12A:
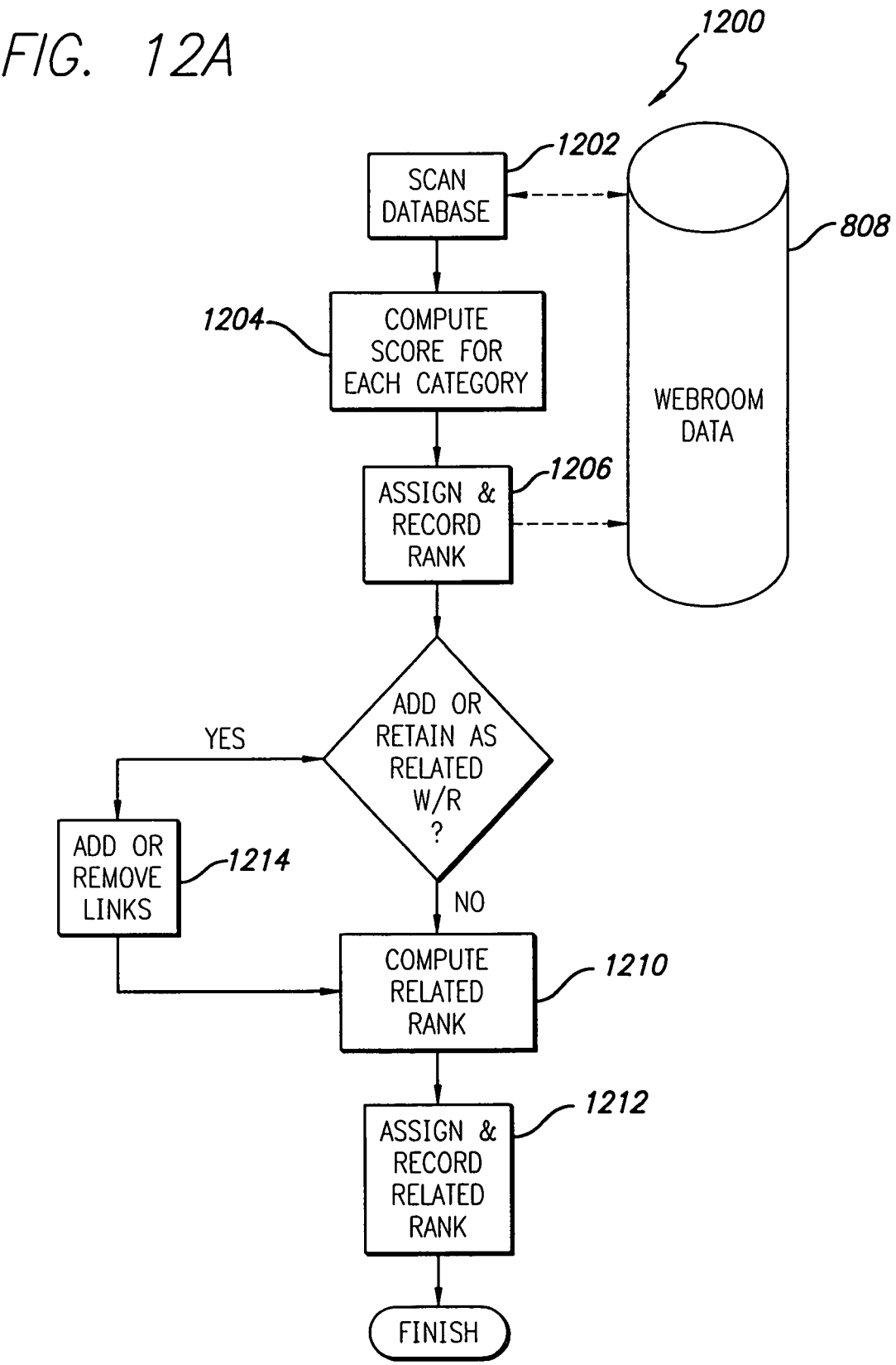
FIG. 12A is a flow chart illustrating a method for ranking related Webroom pages for which links are on a Webroom page menu.

In addition to process 1100 for ranking toplinks, maintenance process 900 preferably includes a process 1200 for ranking related Webrooms, as illustrated in FIG. 12A. As previously described in connection with step 806 of process 800, each Webroom preferably has a database of related Webroom rating data 808. Database 808 preferably comprises rating and activity information for each linked Webroom page, and for Webrooms that are not linked but are otherwise identified as prospective Webrooms for linking. At step 1202, rating and activity information is obtained from database 808. At step 1204, an aggregate score is computed for each rating and activity category. As discussed in connection with process 1000, aggregate scores may be derived using a variety of different statistical measures.

At step 1206, the Webroom pages are assigned a score in each rating and activity category. At steps 1208 and 1214, Webroom pages that fail to achieve a predetermined minimum score in one or more categories are identified and their links are removed from the toplist. Also at steps 1208 and 1214, Webrooms that have newly achieved a predetermined minimum score are linked to the Webroom undergoing maintenance. At step 1210, the linked Webrooms are ranked. Preferably, an overall (or default) ranking is determined for the linked Webrooms. Additionally, a ranking in one or more rating or activity categories may be determined for providing users an option to view alternative rankings. For example, Webroom pages may be separately ranked according to their scores in a relevance category, or according to their popularity. Ranking is preferably continuous, that is, Webrooms are preferably ranked in a sequence. Whatever ranking system is used, it should be designed to facilitate a central purpose of identifying the most closely related and useful Webrooms. Webrooms that fail to meet minimum standards, which may vary depending on the topics of other Webrooms linked to the Webroom undergoing maintenance, have their links removed. Standards may change, for example, when new Webrooms are created and linked that are focused on narrower topics more closely related to the Webroom. For example, in an initial stage of evolution, a Webroom having a topic of "dogs" may be linked to a Webroom with a topic of "cats," but as the Webroom system evolves, and many more dog-specific Webrooms are created, the link to the cat Webroom may be removed.

At step 1212, the page rank and scores are recorded in database 808. A table 1220 exemplary of ranking and scoring data that may be recorded is provided in FIG. 12B. Table 1220 comprises rows 1222 and columns 1224. Each row of rows 1222, for example, rows 1231-1232, is assigned to a unique Webroom. Each column, for example, columns 1241-1249, is assigned to a rating or activity category. It should be noted that table 1220 contains a section of columns (e.g., columns 1241-1242 and 1244-1249) for data pertaining to a particular related Webroom, and another section of columns (e.g., column 1243) for general related Webroom data, such as number of related Webroom member users. Each Webroom will have different data in its own table 1220, reflecting that Webrooms are rated with respect to their relationship to other Webrooms. Exemplary data is provided in each cell of the table 1220 to illustrate how different rating and activity information may be used to classify pages.

For example, column 1241 contains a relatedness rank, and column 1242 contains a measurement of the number of times the related Webroom has been linked to. A column (not shown) may additionally be provided for a count of the number of votes received, that is, the number of times the Webroom has been rated as related to its target Webroom by its users. Column 1243 contains a count of the number of members for each related Webroom. Columns 1244 through 1246 contain each page's aggregate score in the respective categories of relevance, depth, and breadth. Column 1247 contains a count of the number of posts in the Webroom. Column 1248 contains a classification optionally assigned to each Webroom on the basis of other information in the table. Column 1249 contains the Webroom rank relative to other linked Webrooms in the same classification.

A comparison of the Webrooms is made using the exemplary data. Row 1231 pertains to Webroom1, showing relatively high relevance and depth of information, but relatively low rating for breadth of information (indicating the posts are narrowly focused on the topic, which promotes good topical organization). Accordingly, Webroom1 has a relatively high rank of nine. Also, Webroom1 is classified as an "Academic" Webroom, and is ranked fifth in its classification. Data for Webroom2 is shown on row 1232. Webroom2 has a relatively high level of activity, and good relevance, but a low depth rating with a corresponding high breadth rating, indicating a poor focus on the topic and relatively little information. Accordingly, Webroom2 has a low ranking of fifty-six. However, Webroom2 is classified as a children's page, and has a relatively higher rank of ten in its own class, indicating that it may be of interest to children. One skilled in the art will recognize from the foregoing example that a wide variety of rating and activity data may be recorded, and used to classify and rank Webrooms in numerous ways, without departing from the scope of the invention.

It should be generally noted that the topical focus of Webrooms will change over time, and thus relationships between Webrooms is subject to change. Therefore, users preferably rate related Webrooms (and related Web pages and posts) continually. Also, the weight of rating information is preferably related to its age. That is, older information is of less value for rating purposes. In preferred embodiments of the invention, rating data is time stamped, and is analyzed on a variety of time frames and other measures of duration. For example, data may be analyzed only for the past week, month, 100 votes, 5000 accesses, 2000 posts, and so forth. Thus, data received prior to the selected duration measure would be discounted or discarded for the purpose of determining current rankings Webrooms which do not achieve a necessary minimum ranking and thus are not listed as related, are also subject to change in topical focus and may, at some future point, become related. Thus, in one preferred embodiment, a Webroom that fails to become listed as related is held in suspense for an appropriate period of time, and once the time has passed, the Webroom can again be nominated as related to the Webroom for which the relation ranking had previously failed. The duration measures may be increased based on the number of such failed nominations. For example, if a Webroom (A) has been nominated and failed to be voted as related to another Webroom (B) on several occasions, that Webroom (A) may need to wait much longer before it can again be nominated as related to Webroom (B), although it may immediately be nominated as related to Webroom (C). One skilled in the art will recognize that other variations on determining related Webrooms are possible, without departing from the scope of the invention.

Figures 12B, 12C:
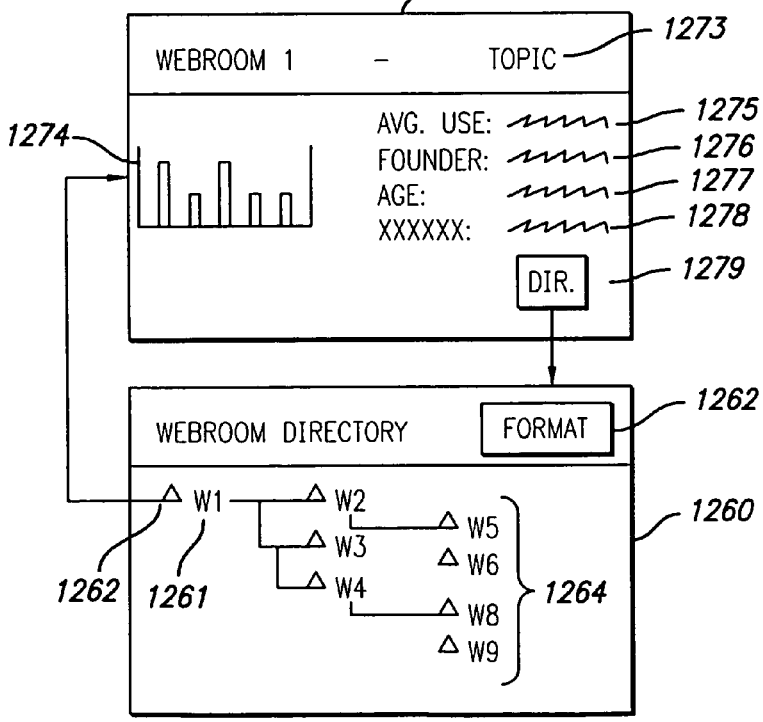
FIG. 12B is an illustration of a data table containing exemplary Webroom page rating and ranking data.
FIG. 12C is an illustration of an exemplary display of Webroom page rating and ranking information on a Web page.

Preferably, selected Webroom rating information may be viewed by Webroom users. For example, Webroom directory 1260 is preferably provided on root menu page 570, as illustrated in FIG. 12C. Menu 1260 preferably contains a directory 1264 of Webrooms. The directory may be presented in various formats, such as a tree format as depicted in FIG. 12C, or as a list in a ranked order (not shown). A user preferably may select different formats using a selection tool, such as format button 1262. Each entry in the directory 1264 preferably comprises a hyperlink 1261 to its related Webroom page, and is preferably provided with a hyperlink 1262 to a Webroom information page 1270. Information page 1270 is preferably provided with graph 1274 or other presentation of Webroom activity and rating information, and specific information, such as topic 1273, average use level 1275, founder identity 1276, age 1277, and progeny (spun off Webrooms) 1278. Additionally, page 1270 preferably includes a hyperlink 1279 to directory page 1260. Directory 1260 may additionally include scrolling tools for scrolling through the directory (not shown).

Returning to FIG. 9, after completion of the processes for ranking users, related Web pages, and related Webrooms have been completed, at step 904, the Webroom pages are regenerated to reflect any changes in user, toplist, or Webroom rankings. At step 906, the databases of posts 616, post ratings 608, and page ratings 708 are searched to identify related topics in the postings or linked Web pages. The search 906 may use rating patterns to identify groups of postings or linked pages having relatively low relevance rankings, but relatively high rankings in other categories, such as activity, that reflect user interest. Any groups of pages and postings with these rating patterns are searched to identify common keywords. If a common set of repeated keywords is identified, at step 908, a determination of whether the postings relate to a new topic is made. Preferably, the determination is made with the help of a user, such as the founding user, or some other person with an interest in the Webroom and competent for making a topic determination. Various guidelines and predetermined criteria may be used to guide decisions on whether a new topic is present, using similar considerations as discussed above with respect to step 416 of process 400 (founding a Webroom).

If a new topic is identified, at step 910, a determination of whether to found a new Webroom with the new topic, or divide the existing Webroom, is made. Again, this determination is preferably made with assistance from a human operator, using automatically generated data revealing the prospective new topic. If the posts and other information relating to the new topic can easily be separated from the existing Webroom, at step 912, the Webroom is divided in two, with one part retaining the old topic (or the old topic modified by subtraction of the new topic) along with its related information, and the other part assuming the new topic and its related information. In the case of Webroom division, the two new Webrooms begin with the same user base as the original Webroom, and gradually evolve distinct user sets.

It should be noted that Webrooms with identical topics may be readily merged, and the division process may lead to separate Webrooms with identical topics. For example, if the new topic is separable from the original Webroom, but already covered by a second existing Webroom, the information pertaining to the new topic is preferably removed from the original Webroom and merged into the second Webroom. In this event, the member users of the original Webroom are also added to the second Webroom. Any newly divided or merged Webrooms are then processed beginning at step 902 of the maintenance process 900. If at step 910 it is determined that the Webroom may not be divided because the posts and pages pertaining to the new topic also contain information pertaining to the original topic, then a new Webroom is preferably created for the new topic using a method 400 as discussed above, and the original Webroom resumes the maintenance process at step 914.

At step 914, the activity scores of the Webroom as a whole are analyzed and compared to predetermined criteria, to determine if enough activity exists to warrant remaining active. If it is determined at step 916 that there is insufficient activity, the Webroom goes into hibernation at step 918, meaning that its databases are archived and the Webroom is inactivated until a renewed interest in the Webroom topic "awakens" it from hibernation. Conversely, if sufficient activity is found, then the Webroom resumes normal operation until the next maintenance cycle 900 is initiated at step 902. Thus, the foregoing process 900 provides for preserving and increasing the topical organization of the Webroom system, and of individual Webrooms within the system, even as the amount of information in the Webroom system grows.

Figure 13A:
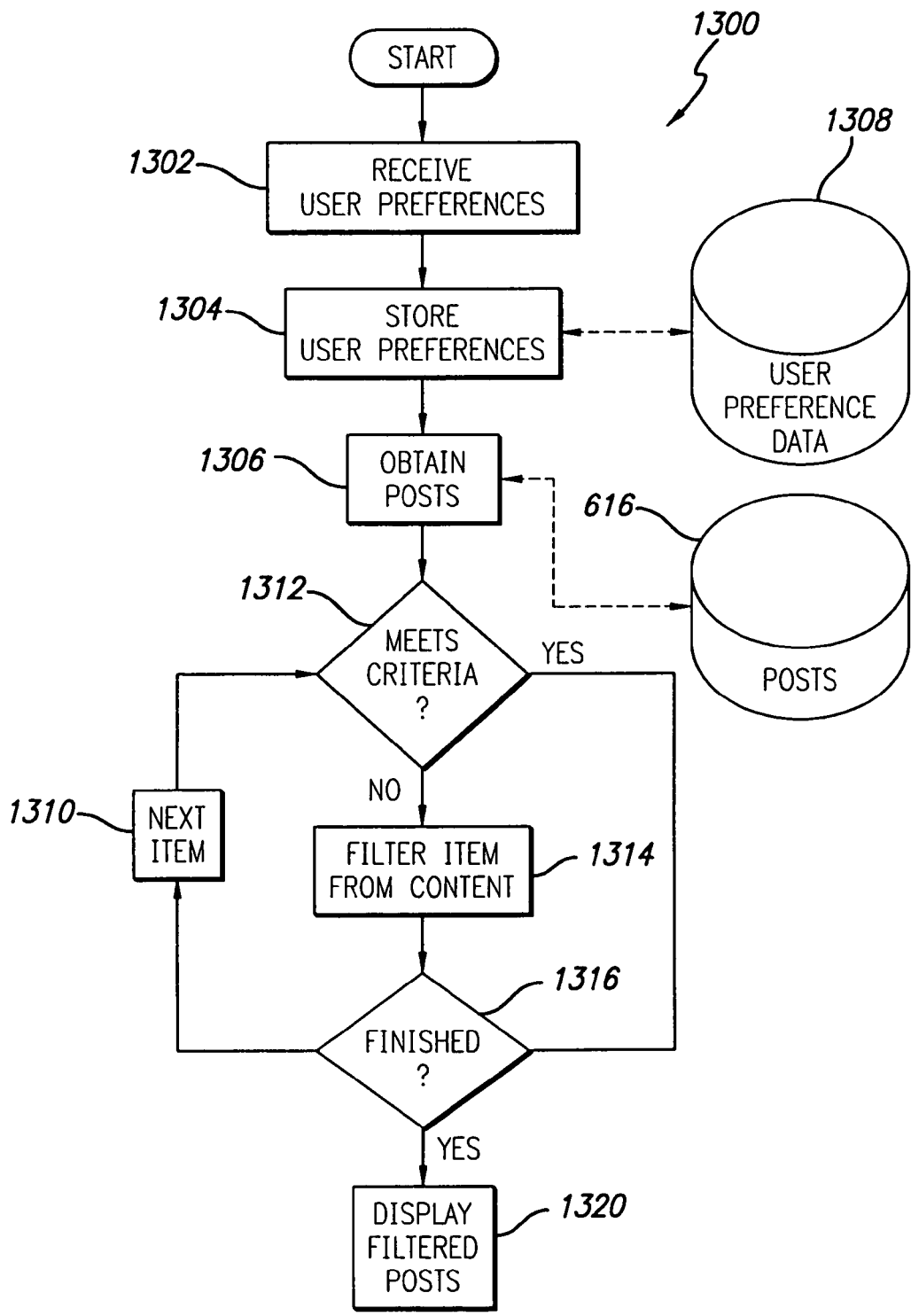
FIG. 13A is a flow chart illustrating a method for receiving preference information from a Webroom user, and filtering posts displayed on the user's Webroom page according to threshold criteria specified in the preference information.
Figure 13B:
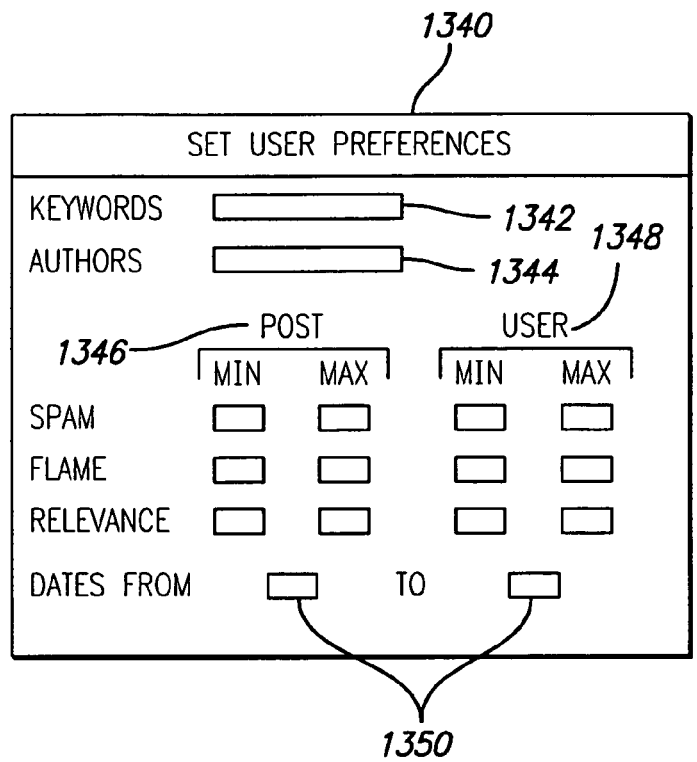
FIG. 13B is an illustration of an exemplary display of a Web page for collecting user preference information.
Figure 14:
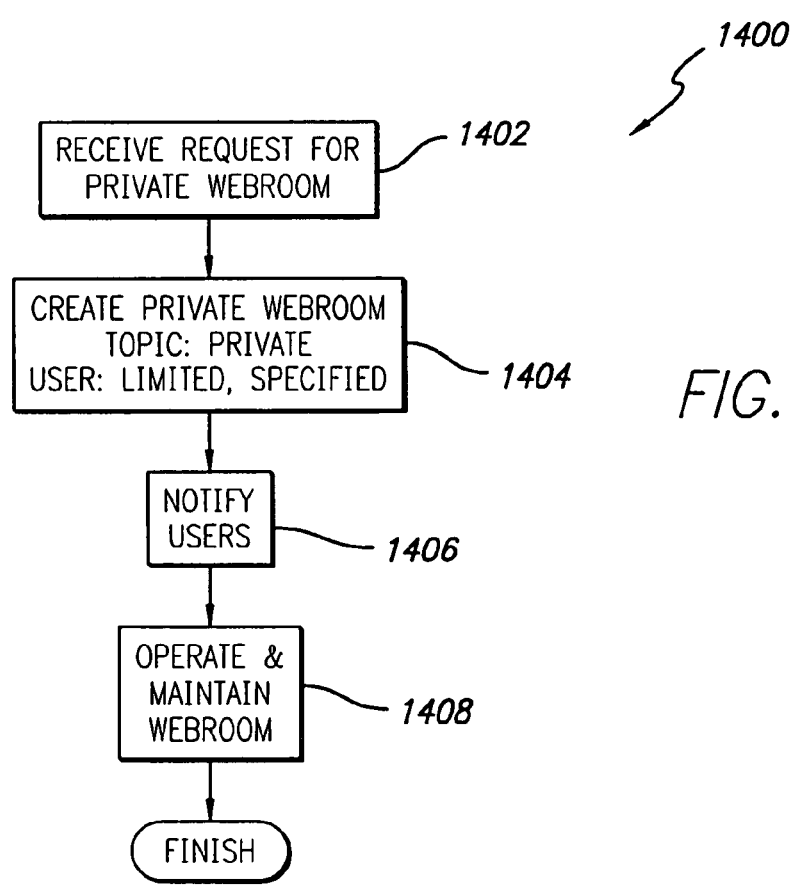
FIG. 14 is a flow chart illustrating a method for providing a private Webroom.

Users are preferably provided with an option to customize their interface with Webroom content by specifying preferences for filtering Webroom posts using post rating data, according to a process 1300 illustrated in FIG. 13A. At step 1302, user preferences are received from a user. Preference data may be obtained using a preference form, such as form 1340 illustrated in FIG. 13B. Preference information is preferably gathered at the time a user registers for Webroom access, and may be changed at any time upon request of the user.

Form 1340 preferably has various data entry fields for entering preference data, including a keyword field 1342, an author field 1344, a series of post rating fields 1346, a series of user rating fields 1348, and date fields 1350. Any combination of the fields may be selected. For example, using the keyword field 1342, the user can specify one or more phrases or keywords for filtering the posts. Similarly, the user can restrict posts by author, by post rank or score, by rank or score of the post authors, or by date, using the aforementioned fields. Additional fields may be provided for filtering posts by any criteria that is measured. Preferably, preferences may be expressed as Boolean expressions, for example, "cat AND NOT dog," as is known in the art for permitting complex queries. In the alternative to form 1340, a relatively small tolerance bar 670 may be provided adjacent to the posts, as illustrated in FIG. 6B, for permitting filtering by preferences that may readily be modified. It is anticipated that filtering posts by user preferences will greatly enhance the utility of prior art information exchange groups. By specifying preferences, users will be able to quickly view those portion of the posts that pertain to their specific interests. Users are also able to prevent the display of posts that they find offensive or uninteresting, such as flames and spam. At the same time, other users who are interested in viewing such posts are able to do so by specifying different preference information. One skilled in the art will recognize that various methods may be used for obtaining user preferences without departing from the scope of the invention.

For example, in an embodiment of the invention pertaining to Webrooms which provide for exiling of members, a default user preference is created for tolerance of exiled members. Users are permitted to change this default preference to increase or decrease their tolerance for viewing posts by other members who have had posts rated to be spam, flames or otherwise inappropriate. Thus, a member may be exiled from the vast majority of the group, but viewers who have set a high tolerance for the offense resulting in the exile would nevertheless be able to view posts by the offending member.

Referring again to FIG. 13A, at step 1305, the user preferences are stored in a database 1308. At step 1306, a portion of the Webroom posts are obtained from post database 616 and tested against the preference threshold criteria at step 1312. Posts which do not meet the threshold criteria are rejected (filtered) at step 1314, and at steps 1316 and 1310, steps 1312 and 1314 are repeated until all desired posts have been filtered. At step 1320, the filtered posts are displayed to the user in a manner customary for Webrooms.

The present invention preferably provides for establishment of private Webrooms. Private Webrooms are restricted to specified users, but otherwise operate like Webrooms described above, as illustrated by FIG. 14, providing for organized, private messaging. Private Webroom process 1400 comprises a first step 1402 of receiving a request for a private Webroom. At step 1404, a Webroom is founded according to the process 400 illustrated in FIG. 4A, but specifying a private topic and a group of permitted users. It should be noted that private Webrooms for distinct user groups are preferably permitted to have duplicate topics, unlike public Webrooms. At step 1408, the specified users are notified that the private Webroom is open for operation. At step 1408, the private Webroom is operated and maintained like a public Webroom, except that access is restricted to the specified users.

In an embodiment of private Webrooms, a messaging function is performed. For example, a user request for a private Webroom with specified users can cause a scrolling bar to be displayed across the top of any Webroom page viewed by the specified users which states "You have a private message." Each specified user can click on the notice, which directs the user to the private Webroom where the requesting user's message is located. Access to the Webroom is limited to the requesting user and the specified sender. In this manner, users can receive messages without posting their e-mail address, or without having an e-mail account. To they extent that it is desired, private Webroom users may also make use of the organizing features of regular Webrooms.

Additionally, as previously described in connection with FIG. 6B, an e-mail forwarding method is preferably provided to allow direct e-mailing between members, without requiring members to publicly disclose their e-mail address. In preferred embodiments, members provide their e-mail address at the time of registration. The member e-mail addresses are stored in a secure, private database by a Webroom mail server. Each post 676 of the Webroom pages 650 preferably includes an e-mail button 674, as previously described. To send an e-mail message to another member, a member may open a post authored by the desired recipient, and select the button 674 (or other command feature). In an alternative embodiment, a private e-mail function is accessed by selecting a member name from a member list. After the function is accessed, a messaging window is provided in which the desired message may be entered. The entered message is then forwarded to the intended recipient at the recipient's private address, without disclosing the address to the sender.

Figure 15:
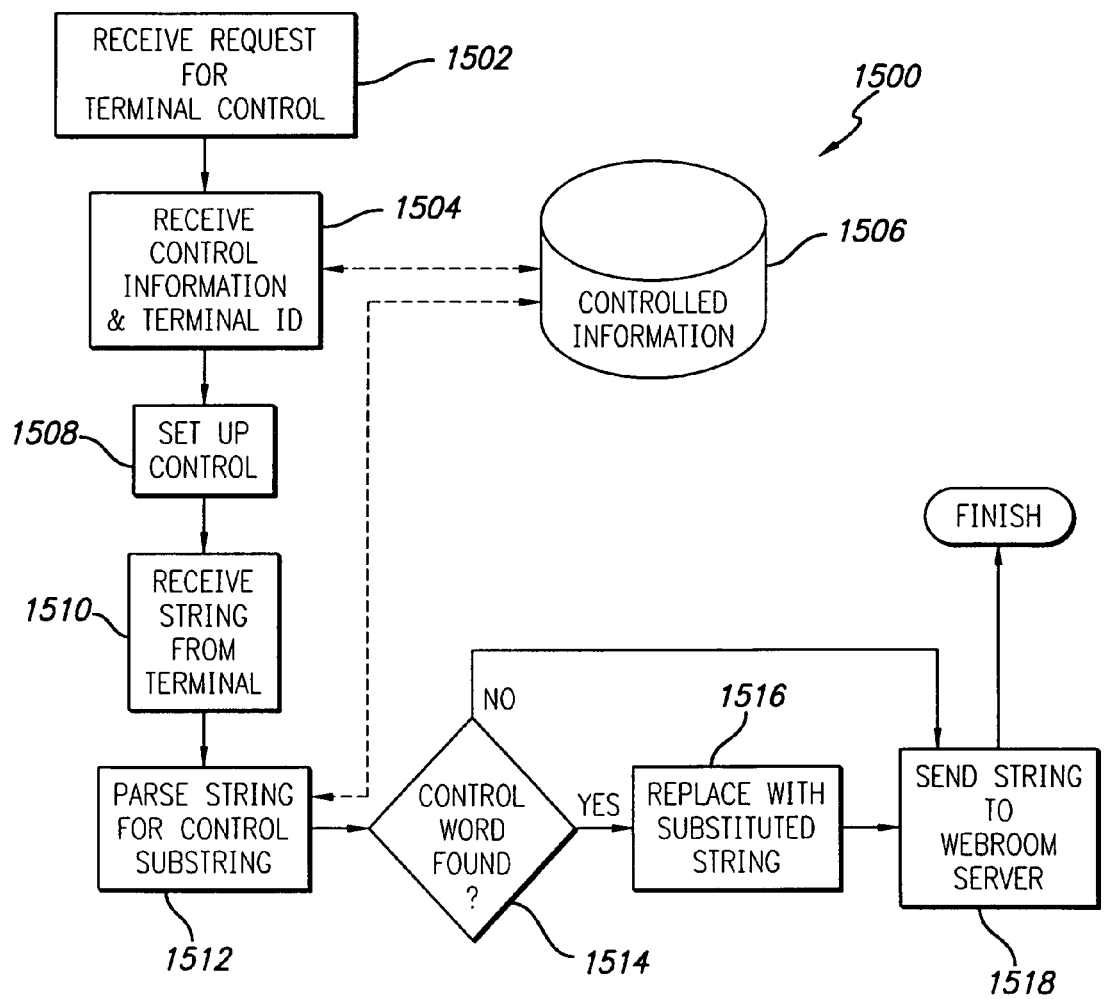
FIG. 15 is a flow chart illustrating a method for providing protection of a user's private information using terminal control.

As a further privacy feature, the present invention provides for controlling terminals to conceal private information from other Webroom users, according to a method 1500 illustrated in FIG. 15. At 1502, the Webroom system receives a request for terminal control from a user. For example, a supervising user, such as a parent, registers for a parental control by providing the phone numbers, names, addresses, or any other private information that the supervising user does not wish revealed, for example, by a child. The Webroom software then stores the private information in a database 1506 at step 1504. Control software is set up at step 1508 that automatically filters posts by any user of that terminal, unless an appropriate password is entered to disable the filter. The software operates by intercepting messages from the terminal at step 1510, and parsing the messages looking for private information (including misspellings and abbreviations of private information) at step 1512. If any private information is found at step 1514, then the message is altered to conceal the private information by replacing it with a substituted string at step 1516. The altered message is then sent to the Webroom server in the usual manner at step 1518.

Method 1500 preferably operates so that the terminal, e.g., a child's computer, properly displays the information as provided by the child, however, an altered string that contains no sign of alteration is sent to the server, and therefore, the Webroom community. For example, "123" and "Green Street" are designated as control strings by a parent of a child user named "Josh", and the substituted strings are "141" and "Spring Street." In this instance, an exchange between Josh and another user would be as follows:

User: What is your address, little boy?

Josh responds and his screen displays: "My address is 123 Green Street."

The server receives and broadcasts: "My address is 141 Spring Street." In this instance, a potentially undesirable user has not received any useful information. In another preferred embodiment, the information is scrambled in line through the use of a public key/private key modality, such as PGP software.

Having thus described a preferred embodiment of Webrooms, it should be apparent to those skilled in the art that certain advantages of the within system have been achieved. It should also be appreciated that various modifications, adaptations, and alternative embodiments thereof may be made within the scope and spirit of the present invention. For example, a method for providing a computer-implemented, topically organized self-evolving exchange group on a wide area network has been illustrated, but it should be apparent that the inventive concepts described above would be equally applicable to other information exchange groups on wide area networks. The invention is further defined by the following claims.

What is claimed is:

1. A computer-implemented method for exchanging information within a group of users on a wide area network, comprising:

serving a topic-specific user interface to a plurality of remote clients over a wide area network;

receiving information posts responsive to a defined topic;

receiving a plurality of links to respective different remote information resources, each containing information related to the defined topic from certain of the plurality of remote clients, wherein the plurality of links are distinct from the information posts;

updating the topic-specific user interface to include the information posts and the plurality of links;

updating the topic-specific user interface to include user-interface objects associated with respective posts or links, wherein the user interface objects are configured to enable users to rate the relevance of respective ones of the information posts and of the plurality of links to the defined topic;

receiving user ratings from the plurality of remote clients responsive to the user-interface objects;

aggregating the user ratings from the plurality of remote clients to determine aggregate relevance ratings data;

updating the topic-specific user interface so that the information posts and the plurality of links in the topic-specific user interface are displayed in a ranked order according to the aggregate relevance ratings data;

serving the updated topic-specific user interface to requesting users; and receiving preference information from respective requesting users, wherein the preference information specifies a threshold aggregate relevance ratings data and wherein the topic-specific user interface includes ones of the information posts having aggregate relevance ratings data that exceed the threshold and does not include ones of the information posts having aggregate relevance ratings data less than or equal to the threshold;

wherein at least some of the method is performed by a suitably configured computing system having one or more computing devices.

2. The method according to claim 1, wherein the user-interface objects are further configured to enable the users to rate the respective ones of the information posts and of the plurality of links according to predetermined rating values.

3. The method according to claim 1, further comprising aggregating user ratings for information posts associated with one or more selected users to provide a user rating score.

4. The method according to claim 3, further comprising ranking the one or more selected users according to each user's respective user rating score.

5. The method according to claim 3, further comprising updating the user interface to include one or more of the user rating scores.

6. The method according to claim 3, further comprising receiving preference information from the plurality of remote clients, wherein the preference information specifies threshold criteria, set by respective ones of users employing the remote clients, for filtering the information posts according to the respective user rating scores.

7. The method according to claim 1, further comprising presenting the plurality of links on a menu of a web page.

8. The method according to claim 7, further comprising presenting the plurality of links grouped in a corresponding plurality of menus of the web page, wherein each of the plurality of menus contains links pertaining to a category of information.

9. The method according to claim 1, further comprising performing an action selected from adding a link to the plurality of links, and deleting a link from the plurality of links, according to the aggregated relevance ratings data.

10. The method according to claim 1, further comprising serving an interactive tolerance bar for providing the users an option to send the preference information.

11. The method according to claim 1, further comprising ranking the plurality of links according to a measurement of activity of respective ones of at least a portion of the plurality of links.

12. The method according to claim 11, wherein the measurement of activity of respective ones of the plurality of links comprises measurement of at least one of a first number of requests received by the topic specific user interface for the respective remote information resources of the plurality of links and/or a second number of requests received for the topic-specific user interface from the respective remote information resources of the plurality of links.

13. A computing system comprising one or more computing devices including memory and configured to exchange information within a group of users on a wide area network, comprising:
a computing device operative to:
provide a topic-specific user interface that enables display of a defined topic to a plurality of remote clients over a wide area network;
receive information posts responsive to the defined topic and a plurality of links to respective different remote information resources each containing information related to the defined topic;
receive user ratings indicating relevance of respective ones of the information posts to the defined topic and relevance of ones of the plurality of links to the defined topic;
aggregate the user ratings to determine aggregate relevance ratings for respective information posts and links; and
update the topic-specific user interface to include the information posts and the plurality of links in a ranked order according to the aggregate relevance ratings for respective information posts and links;
receive preference information from respective requesting users, wherein the preference information specifies a threshold aggregate relevance ratings and wherein the topic-specific user interface includes ones of the information posts having aggregate relevance ratings that exceed the threshold and does not include ones of the information posts having aggregate relevance ratings less than or equal to the threshold; and
a data store in communication with the computing device, the data store operative to store at least one of the information posts, the plurality of links, and the user ratings.

14. The system according to claim 13, wherein the computing device is further operative to apply a relative weighting factor to the received user ratings based on one or more attributes associated with the respective user.

15. The system according to claim 13, wherein the computing device is further operative to update the user interface to include the user rating of respective information posts.

16. The system according to claim 13, wherein the computing device is further operative to aggregate user ratings for information posts associated with one or more selected users to provide a user rating score.

17. The system according to claim 16, wherein the computing device is further operative to rank the one or more selected users according to each user's respective user rating score.

18. The system according to claim 16, wherein the computing device is further operative to update the user interface to include one or more user rating scores.

19. The system according to claim 16, wherein a user's ability to provide user ratings is dependent upon their respective user rating score.

20. The system according to claim 13, wherein the ranking of respective ones of the information posts and the plurality of links are time dependent.

21. The system according to claim 20, wherein the ranking of respective ones of the information posts and the plurality of links decreases with time absent receipt of new user ratings.

22. The system according to claim 13, further comprising ranking the plurality of links according to a measurement of activity of respective ones of at least a portion of the plurality of links.

23. The system according to claim 22, wherein the measurement of activity of respective ones of the plurality of links comprises a measurement of at least one of a first number of requests received by the topic-specific user interface for the respective remote information resources of the plurality of links and a second number of requests received for the topic-specific user interface from the respective remote information resources of the plurality of links.

24. A computer-implemented method for exchanging information, the method comprising:
generating a user interface for display of a defined topic that enables user input of information posts related to the defined topic and a plurality of links to respective different remote information resources each containing information related to the defined topic;
for respective information posts,
receiving user ratings indicating relevance of respective information posts to the defined topic from respective users;
aggregating the user ratings for respective information posts to determine aggregate relevance ratings for respective information posts; and
wherein at least some of the information posts are listed in the user interface in a ranked order according to the aggregate relevance ratings for the information posts;
receiving a threshold aggregate relevance rating from respective requesting users, wherein the topic-specific user interface includes ones of the information posts having aggregate relevance ratings that exceed the threshold and does not include ones of the information posts having aggregate relevance ratings less than or equal to the threshold; and
for respective links,
measure activity of respective links; and,
for each link whose measured activity exceeds a selected value, update the user interface to include the respective link in the user interface.

25. The method according to claim 24, wherein activity of respective links comprises at least one of a first number of requests received by the user interface for the remote information resource associated with the respective link and a second number of requests received for the user interface from the remote information resource.

26. The method according to claim 24, wherein links whose measured activity falls below the selected value are not included in the user interface.

27. The method according to claim 24, wherein a relative weighting factor is applied to the received user ratings, based upon the respective user.

28. The method according to claim 24, further comprising updating the user interface to display the user rating of respective information posts.

29. The method according to claim 24, further comprising aggregating user ratings for information posts associated with one or more selected users to provide a user rating score.

30. The method according to claim 29, further comprising ranking the one or more selected users according to each user's respective user rating score.

31. The method according to claim 29, further comprising updating the user interface to include one or more user rating scores.

32. The method according to claim 29, wherein a user's ability to provide user ratings is dependent upon their respective user rating score.

33. A tangible computer-readable storage medium having instructions stored thereon, the instructions comprising:
    instructions for serving a topic-specific user interface to a plurality of remote clients over a wide area network;
    instructions for receiving information posts responsive to the defined topic and a plurality of links to respective different remote information resources, each containing information related to the defined topic from certain of the plurality of remote clients, wherein the plurality of links are distinct from the information posts;
    instructions for updating the topic-specific user interface to include the information posts and the plurality of links;
    instructions for updating the topic-specific user interface to include user-interface objects associated with respective posts or links, wherein the user interface objects are configured to enable users to rate the relevance of respective ones of the information posts and of the plurality of links to the defined topic;
    instructions for receiving user ratings from the plurality of remote clients responsive to the user-interface objects;
    instructions for aggregating the user ratings to determine aggregate relevance ratings;
    instructions for updating the topic-specific user interface so that information posts and the plurality of links in the topic-specific user interface are displayed in a ranked order according to the aggregate relevance ratings;
    instructions for serving the updated topic-specific user interface; and instructions for receiving a threshold aggregate relevance rating, wherein the topic-specific user interface includes ones of the information posts having aggregate relevance ratings that exceed the threshold and does not include ones of the information posts having aggregate relevance ratings less than or equal to the threshold.

34. The tangible computer-readable storage medium according to claim 33, further comprising instructions for aggregating user ratings for information posts associated with one or more selected users to provide a user rating score.

35. The tangible computer-readable storage medium according to claim 34, further comprising instructions for ranking the one or more selected users according to each user's respective user rating score.

36. The tangible computer-readable storage medium according to claim 34, further comprising instructions for updating the user interface to include one or more of the user rating scores.

37. The tangible computer-readable storage medium according to claim 33, further comprising instructions for performing an action selected from adding a link to the plurality of links, and deleting a link from the plurality of links, according to the aggregated relevance ratings.

38. The tangible computer-readable storage medium according to claim 37, further comprising instructions for serving an interactive tolerance bar for providing the users an option to send the preference information.

39. The tangible computer-readable storage medium according to claim 33, further comprising instructions for ranking the plurality of links according to measurement of activity of respective ones of at least a portion of the plurality of links.

40. The tangible computer-readable storage medium according to claim 39, wherein measurement of activity of respective ones of the plurality of links comprises measurement of at least one of a first number or requests received by the user interface for the respective remote information resources of the plurality of links and a second number of requests received for the user interface from the respective remote information resources of the plurality of links.

41. The tangible computer-readable storage medium according to claim 33, wherein the ranking of respective ones of the information posts and the plurality of links are time dependent.

42. The tangible computer-readable storage medium according to claim 41, wherein the ranking of respective ones of the information posts and the plurality of links decrease with time absent receipt of new user ratings.

* * * * *

UNITED STATES PATENT AND TRADEMARK OFFICE
CERTIFICATE OF CORRECTION

| | | |
|---|---|---|
| PATENT NO. | : 7,752,251 B1 | Page 1 of 1 |
| APPLICATION NO. | : 09/648474 | |
| DATED | : July 6, 2010 | |
| INVENTOR(S) | : Brian Mark Shuster et al. | |

It is certified that error appears in the above-identified patent and that said Letters Patent is hereby corrected as shown below:

Sheet 5 of 22, line 3, delete "7" and insert -- ? --.

In column 14, line 24, delete "5B" and insert -- 5B. --.

In column 28, line 11, delete "provided," and insert -- provided --.

In column 30, line 14, delete "rankings" and insert -- rankings. --.

Signed and Sealed this
Seventeenth Day of April, 2012

David J. Kappos
*Director of the United States Patent and Trademark Office*